(12) United States Patent
Gao et al.

(10) Patent No.: US 12,732,925 B2
(45) Date of Patent: Sep. 8, 2026

(54) PHYSICAL UPLINK CONTROL CHANNEL (PUCCH) POWER CONTROL TOWARDS MULTIPLE TRANSMISSION-AND-RECEPTION POINTS (TRPS)

(71) Applicant: Telefonaktiebolaget LM Ericsson (publ), Stockholm (SE)

(72) Inventors: Shiwei Gao, Nepean (CA); Helka-Liina Määttänen, Espoo (FI); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 295 days.

(21) Appl. No.: 18/553,937

(22) PCT Filed: Apr. 6, 2022

(86) PCT No.: PCT/IB2022/053237

§ 371 (c)(1),
(2) Date: Oct. 4, 2023

(87) PCT Pub. No.: WO2022/215009

PCT Pub. Date: Oct. 13, 2022

(65) Prior Publication Data

US 2024/0373372 A1 Nov. 7, 2024

Related U.S. Application Data

(60) Provisional application No. 63/171,349, filed on Apr. 6, 2021.

(51) Int. Cl.

| | |
|---|---|
| ***H04W 52/40*** | (2009.01) |
| ***H04W 52/14*** | (2009.01) |
| ***H04W 72/21*** | (2023.01) |

(52) U.S. Cl.
CPC ......... *H04W 52/40* (2013.01); *H04W 52/146* (2013.01); *H04W 72/21* (2023.01)

(58) Field of Classification Search
CPC ... H04W 52/40; H04W 52/146; H04W 72/21; H04W 52/54
See application file for complete search history.

(56) References Cited

U.S. PATENT DOCUMENTS

| | | | | |
|---|---|---|---|---|
| 12,309,708 | B2 * | 5/2025 | Zhang | H04W 52/08 |
| 12,418,920 | B2 * | 9/2025 | Yuan | H04L 5/0048 |

(Continued)

FOREIGN PATENT DOCUMENTS

| | | |
|---|---|---|
| CN | 107637001 A | 1/2018 |
| CN | 108134659 A | 6/2018 |

(Continued)

OTHER PUBLICATIONS

Japanese Office Action dated Dec. 6, 2024 and English summary translation of the Japanese Office Action issued in corresponding Japanese Patent Application No. 2023-561400, consisting of 6 pages.

(Continued)

*Primary Examiner* — Fayyaz Alam
(74) *Attorney, Agent, or Firm* — Weisberg I.P. Law, P.A.

(57) ABSTRACT

A method, system and apparatus are disclosed for physical uplink control channel (PUCCH) power control towards multiple transmission and reception points (TRPs). According to one aspect, a method in a network node includes configuring a wireless device (WD) with a list of at least two power control parameter sets for power control of a PUCCH applicable to at least one of at least one PUCCH resource and at least one group of PUCCH resources. The method also includes transmitting a medium access control (MAC) control element (CE) to the WD to activate at least one (Continued)

ONE SLOT (14 SYMBOLS)

PDCH (DATA) CONTROL (PDCCH), POSSIBLY DATA power control parameter set from the list of power control parameter sets applicable to at least one of (1) one PUCCH resource, (2) each one of multiple PUCCH resources, and (3) multiple groups of PUCCH resources.

16 Claims, 14 Drawing Sheets

(56) References Cited

U.S. PATENT DOCUMENTS

| | | | |
|---|---|---|---|
| 2019/0349964 | A1 | 11/2019 | Liou |
| 2020/0412506 | A1 | 12/2020 | Maattanen et al. |
| 2021/0007063 | A1 | 1/2021 | Yao et al. |
| 2021/0037516 | A1 | 2/2021 | Lyu et al. |
| 2025/0202655 | A1* | 6/2025 | Grossmann ........... H04L 5/0051 |
| 2025/0310899 | A1* | 10/2025 | Khoshnevisan .... H04W 52/242 |

FOREIGN PATENT DOCUMENTS

| | | | |
|---|---|---|---|
| CN | 111587553 | A | 8/2020 |
| CN | 111771349 | A | 10/2020 |
| JP | 2020-529808 | A | 10/2020 |
| JP | 2022-547778 | | 11/2022 |
| WO | 2021/007854 | | 1/2021 |

OTHER PUBLICATIONS

International Search Report and Written Opinion dated Jul. 6, 2022 issued in PCT Application No. PCT/IB2022/053237 filed Apr. 6, 2022, consisting of 19 pages.

3GPP TSG-RAN WG1 Meeting #1044-e Tdoc R1-2101093; Agenda Item: 8.1.2.1; Source: Xiaomi; Title: Enhancements on Multi-TRP for PDCCH, PUCCH and PUSCH; Document for: Discussion and Decision; e-Meeting, Jan. 25-Feb. 5, 2021, consisting of 19 pages.

3GPP TSG RAN WG1 #104-e R1-2101900; Agenda item: 8.1.2.1; Source: Moderator (Nokia); Title: Summary #2 of Multi-TRP for PUCCH and PUSCH; Document for: Discussion and Decision; e-Meeting, Jan. 25-Feb. 5, 2021, consisting of 86 pages.

3GPP TS 38.321 V16.4.0 (Mar. 2021) 3rd Generation Partnership Project; Technical Specification Group Radio Access Network; NR; Medium Access Control (MAC) protocol specification (Release 16), consisting of 157 pages.

3GPP TS 36.212 V16.5.0 (Mar. 2021) 3rd Generation Partnership Project; Technical Specification Group Radio Access Network; Evolved Universal Terrestrial Radio Access (E-UTRA); Multiplexing and channel coding (Release 16), consisting of 255 pages.

3GPP TS 38.101-2 V17.1.0 (Mar. 2021) 3rd Generation Partnership Project; Technical Specification Group Radio Access Network; NR; User Equipment (UE) radio transmission and reception; Part 2: Range 2 Standalone (Release 17), consisting of 190 pages.

3GPP TS 38.101-3 V17.1.0 (Mar. 2021) 3rd Generation Partnership Project; Technical Specification Group Radio Access Network; NR; User Equipment (UE) radio transmission and reception; Part 3: Range 1 and Range 2 Interworking operation with other radios (Release 17), consisting of 716 pages.

3GPP TS 38.321 V16.3.0 (Dec. 2020) 3rd Generation Partnership Project; Technical Specification Group Radio Access Network; NR; Medium Access Control (MAC) protocol specification (Release 16), consisting of 156 pages.

3GPP TS 38.331 V16.4.1 (Mar. 2021) 3rd Generation Partnership Project; Technical Specification Group Radio Access Network; NR; Radio Resource Control (RRC) protocol specification (Release 16), consisting of 949 pages.

Chinese Office Action and summary English translation of the Chinese Office Action dated May 11, 2026 issued in Chinese Application No. 2022800266972, consisting of 25 pages.

3GPP TSG RAN WG1 Meeting #98bis R1-191028; Source: ZTE; Title: Enhancements on multi-beam operation; Agenda Item: 7.2.8.3; Document for: Discussion and Decision; Chongqing, China, Oct. 14-20, 2019, consisting of 24 pages.

3GPP TSG RAN WG1 Meeting #98bis R1-1910590; Source: LG Electronics; Title: Feature lead summary of Enhancements on Multi-beam Operations; Agenda item: 7.2.8.3; Document for: Discussion and Decision; Chongqing, China, Oct. 14-20, 2019, consisting of 21 pages.

3GPP TSG RAN WG1 Meeting #104-e Tdoc R1-2101093; Source: Xiaomi; Title: Enhancements on Multi-TRP for PDCCH, PUCCH and PUSCH; Agenda Item: 8.1.2.1; Document for: Discussion and Decision; e-Meeting, Jan. 25-Feb. 5, 2021, consisting of 19 pages.

3GPP TSG RAN WG2 #108 Tdoc R2-1914718; Source: Ericsson; Title: PUCCH MAC CE and SRS MAC CE; Agenda Item: 6.16.2; Document for: Discussion, Decision; Reno, Nevada, US Nov. 18 to 22, 2019, consisting of 6 pages.

* cited by examiner

ONE SLOT (14 SYMBOLS)

PDCH (DATA) CONTROL (PDCCH), POSSIBLY DATA

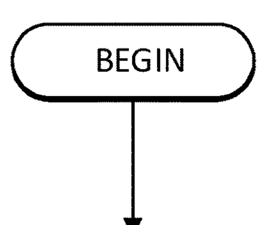

SEND A MEDIUM ACCESS CONTROL, MAC, CONTROL ELEMENT, CE, TO THE WD, THE MAC CE INDICATING AN ASSOCIATION BETWEEN I) ONE OF A PHYSICAL UPLINK CONTROL CHANNEL, PUCCH, RESOURCE AND A PUCCH RESOURCE GROUP; AND II) AT LEAST ONE FIRST PUCCH POWER CONTROL PARAMETER SET OUT OF A PLURALITY OF PUCCH POWER CONTROL PARAMETER SETS
S134

OPTIONALLY, RECEIVE A PUCCH TRANSMISSION FROM THE WD ON THE ONE OF THE PUCCH RESOURCE AND THE PUCCH RESOURCE GROUP, THE PUCCH TRANSMISSION COMPRISING A TRANSMIT POWER LEVEL BASED ON THE AT LEAST ONE FIRST PUCCH POWER CONTROL PARAMETER SET THAT IS ASSOCIATED TO THE ONE OF THE PUCCH RESOURCE AND THE PUCCH RESOURCE GROUP
S136

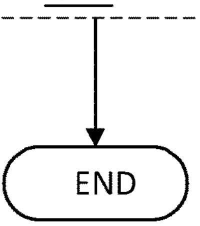

FIG. 10

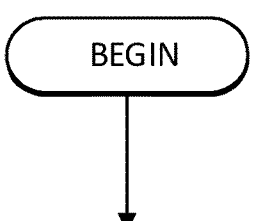

RECEIVE A MEDIUM ACCESS CONTROL, MAC, CONTROL ELEMENT, CE, AT THE WD, THE MAC CE INDICATING AN ASSOCIATION BETWEEN I) ONE OF A PHYSICAL UPLINK CONTROL CHANNEL, PUCCH, RESOURCE AND A PUCCH RESOURCE GROUP; AND II) AT LEAST ONE FIRST PUCCH POWER CONTROL PARAMETER SET OUT OF A PLURALITY OF PUCCH POWER CONTROL PARAMETER SETS
S138

OPTIONALLY, TRANSMIT A PUCCH TRANSMISSION ON THE ONE OF THE PUCCH RESOURCE AND THE PUCCH RESOURCE GROUP, THE PUCCH TRANSMISSION COMPRISING A TRANSMIT POWER LEVEL BASED ON THE AT LEAST ONE FIRST PUCCH POWER CONTROL PARAMETER SET THAT IS ASSOCIATED TO THE ONE OF THE PUCCH RESOURCE AND THE PUCCH RESOURCE GROUP
S140

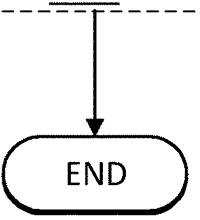

FIG. 11

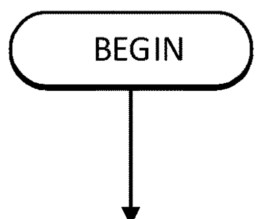

CONFIGURE THE WD WITH A LIST OF AT LEAST TWO OR MORE POWER CONTROL PARAMETER SETS FOR POWER CONTROL OF A PHYSICAL UPLINK CONTROL CHANNEL, PUCCH, AND APPLICABLE TO AT LEAST ONE OR MULTIPLE OF AT LEAST ONE PUCCH RESOURCE(S) AND AT LEAST ONE OR MULTIPLE GROUPS OF PUCCH RESOURCES S142

TRANSMIT THE A MEDIUM ACCESS CONTROL, MAC, CONTROL ELEMENT, CE, TO THE WD TO ACTIVATE AT LEAST ONE OR TWO POWER CONTROL PARAMETER SETS FROM THE LIST OF POWER CONTROL PARAMETER SETS APPLICABLE TO ANY AT LEAST ONE OF (1) ONE PUCCH RESOURCE, (2) EACH ONE OF THE MULTIPLE PUCCH RESOURCES, AND OR (3) THE MULTIPLE GROUPS OF PUCCH RESOURCES S144

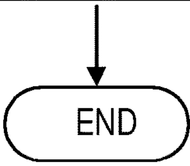

FIG. 12

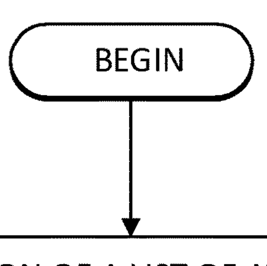

RECEIVE A CONFIGURATION OF A LIST OF AT LEAST TWO POWER CONTROL PARAMETER SETS FOR POWER CONTROL OF A PHYSICAL UPLINK CONTROL CHANNEL, PUCCH, APPLICABLE TO AT LEAST ONE OF AT LEAST ONE PUCCH RESOURCE AND AT LEAST ONE GROUP OF PUCCH RESOURCES S146

SET A TRANSMIT POWER LEVEL BASED AT LEAST IN PART ON AT LEAST ONE OF THE AT LEAST TWO POWER CONTROL PARAMETER SETS IN THE LIST S148

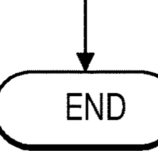

FIG. 13

| | | | | |
|---|---|---|---|---|
| E | SERVICE CELL ID (5BITS) | | BWP ID (2BITS) | OCT 1 |
| R | PUCCH RESOURCE ID | | | OCT 2 |
| $S_1$ | $S_0$ | SPATIAL RELATION INFO ID | | OCT 3 |

. . .

| | | | |
|---|---|---|---|
| R | PUCCH RESOURCE ID | | OCT 2N-2 |
| $S_1$ | $S_0$ | SPATIAL RELATION INFO ID | OCT 2N-1 |

FIG. 20

PHYSICAL UPLINK CONTROL CHANNEL (PUCCH) POWER CONTROL TOWARDS MULTIPLE TRANSMISSION-AND-RECEPTION POINTS (TRPS)

CROSS-REFERENCE TO RELATED APPLICATIONS

This application is a Submission Under 35 U.S.C. § 371 for U.S. National Stage Patent Application of International Application No.: PCT/IB2022/053237, filed Apr. 6, 2022 entitled "PHYSICAL UPLINK CONTROL CHANNEL (PUCCH) POWER CONTROL TOWARDS MULTIPLE TRANSMISSION-AND-RECEPTION POINTS (TRPS)," which claims priority to U.S. Provisional Application No. 63/171,349, filed Apr. 6, 2021, entitled "PUCCH POWER CONTROL TOWARDS MULTIPLE TRPS," the entireties of both of which are incorporated herein by reference.

TECHNICAL FIELD

The present disclosure relates to wireless communications, and in particular, to physical uplink control channel (PUCCH) power control towards multiple transmit receive points (TRPs).

BACKGROUND

NR Frame Structure and Resource Grid

Third Generation Partnership Project (3GPP) New Radio (NR, also called $5^{th}$ Generation or 5G) uses CP-OFDM (Cyclic Prefix Orthogonal Frequency Division Multiplexing) in both downlink (DL) (i.e., from a network node, gNB, or base station, to a wireless device (WD, also called user equipment or UE) and uplink (UL) (i.e., from WD to gNB). Discrete Fourier transform (DFT)-spread OFDM is also supported in the uplink. In the time domain, NR downlink and uplink are organized into equally sized subframes of 1 millisecond (ms) each. A subframe is further divided into multiple slots of equal duration. The slot length depends on subcarrier spacing. For subcarrier spacing of Δf=15 kHz, there is only one slot per subframe, and each slot consists of 14 OFDM symbols.

Data scheduling in NR is typically on a slot basis, an example is shown in FIG. 1 with a 14-symbol slot, where the first two symbols contain physical downlink control channel (PDCCH) and the rest contains physical shared data channel, either PDSCH (physical downlink shared channel) or PUSCH (physical uplink shared channel).

Different subcarrier spacing values are supported in NR. The supported subcarrier spacing values (also referred to as different numerologies) are given by Δf=(15×2^μ) kHz where μ∈{0,1,2,3,4}. Δf=15 kHz is the basic subcarrier spacing. The slot durations at different subcarrier spacings may be given by ½^μ ms.

In the frequency domain, a system bandwidth is divided into resource blocks (RBs), each corresponds to 12 contiguous subcarriers. The RBs are numbered starting with 0 from one end of the system bandwidth. The basic NR physical time-frequency resource grid is illustrated in FIG. 2, where only one resource block (RB) within a 14-symbol slot is shown. One OFDM subcarrier during one OFDM symbol interval forms one resource element (RE).

Downlink (DL) PDSCH transmissions can be either dynamically scheduled on a slot-by-slot basis, or semi-persistently scheduled (SPS). Dynamic PDSCH scheduling may be performed by sending downlink control information (DCI) over PDCCH (Physical Downlink Control Channel). Different DCI formats are defined in NR for DL PDSCH scheduling including DCI format 1_0, DCI format 1_1, and DCI format 1_2. For SPS, periodic PDSCH transmissions may be activated or deactivated by DCI.

Similarly, uplink (UL) PUSCH transmission may also be scheduled either dynamically or semi-persistently with uplink grants carried in PDCCH. The DCI formats for scheduling PUSCH include DCI format 0_0, DCI format 0_1, and DCI format 0_2.

Physical Uplink Control Channel (PUCCH)

In NR. PUCCH is used to carry uplink control information (UCI) such as hybrid automatic repeat request acknowledgement (HARQ-ACK), channel state information (CSI), or scheduling request (SR).

There are five PUCCH formats defined in NR, i.e., PUCCH formats 0 to 4, with different payload capacity and duration in time. A WD may be configured with multiple PUCCH resources, each associated with a PUCCH format.

Spatial relation is used in NR to refer to a spatial relationship between an UL channel or signal, such as PUCCH, PUSCH, or sounding reference signal (SRS), and a DL reference signal (RS), such as CSI reference signal (CSI-RS), synchronization signal (SS), physical broadcast channel block (SSB), or a UL sounding reference signal (SRS). If an UL channel is spatially related to a DL RS, a WD is expected to transmit the UL channel with a same antenna pattern or beam for receiving the DL RS. If an UL channel is spatially related to an UL SRS, then the WD may be expected to apply a same antenna pattern or beam for the UL channel and the SRS.

Up to 64 PUCCH spatial relations may be configured for a WD. For each PUCCH resource, one of the spatial relations may be activated or updated by a command carried in a Medium Access Control (MAC) Control Element (CE).

Note that PUCCH spatial relation may not be configured in frequency NR range one (FR1). In that case, a default relation may be defined.

There is provided below a PUCCH spatial relation information element (IE) that a WD can be configured for a UL bandwidth part (BWP) in NR. It includes one of an SSB index, a CSI-RS resource index, and a SRS resource index, as well as some power control parameters such as a pathloss reference RS Index, a P0-PUCCH index, and a closed-loop index.

PUCCH-SpatialRelationInfo information element

```
-- ASN1START
-- TAG-PUCCH-SPATIALRELATIONINFO-START
PUCCH-SpatialRelationInfo ::=          SEQUENCE {
  pucch-SpatialRelationInfoId           ,
  servingCellId                        ServCellIndex      OPTIONAL,   -- Need S
  referenceSignal                      CHOICE {
    ssb-Index                          SSB-Index,
```

-continued

PUCCH-SpatialRelationInfo information element

```
    csi-RS-Index                    NZP-CSI-RS-ResourceId,
    srs                    PUCCH-SRS
  },
  pucch-PathlossReferenceRS-Id                  ,
  p0-PUCCH-Id                     ,
  closedLoopIndex                 ENUMERATED { i0, i1 }
}
PUCCH-SpatialRelationInfoExt-r16 ::=              SEQUENCE {
  pucch-SpatialRelationInfoId-v1610                    OPTIONAL,   -- Cond
SetupOnly
  pucch-PathlossReferenceRS-Id-v1610                   OPTIONAL,   --Need
R
  ...
}
PUCCH-SRS ::=              SEQUENCE {
  resource                 SRS-ResourceId,
  uplinkBWP                   BWP-Id
}
-- TAG-PUCCH-SPATIALRELATIONINFO-STOP
-- ASN1STOP
```

To facilitate faster UL beam selection in frequency 2 (FR2), a unified transmission configuration indicator (TCI) framework is currently under discussion in 3GPP NR Rel-17 to replace spatial relations in the UL. A TCI state is used in NR to indicate a so-called quasi co-location (QCL) properties between a DL source RS and a DL target RS. If the WD knows that two signals are QCL with respect to a certain parameter (e.g., Doppler spread), the WD can estimate that parameter based on one signal and apply that estimate for receiving the other signal. Four types of QCL relations were defined as:

Type A: {Doppler shift, Doppler spread, average delay, delay spread};

Type B: {Doppler shift, Doppler spread};

Type C: {average delay, Doppler shift}; and

Type D: {Spatial Rx parameter}.

A TCI state may contain up to two types of QCL information. A TCI state IE is shown below, where if two QCL types are indicated, one of them is a type-D QCL.

TCI-State information element

```
-- ASN1START
-- TAG-TCI-STATE-START
TCI-State ::=           SEQUENCE {
  tci-StateId           ,
  qcl-Type1               QCL-Info,
  qcl-Type2               QCL-Info              OPTIONAL,
-- Need R
  ...
}
QCL-Info ::=            SEQUENCE {
  cell               ServCellIndex              OPTIONAL, -
- Need R
  bwp-Id               BWP-Id                  OPTIONAL, --
Cond CSI-RS-Indicated
  referenceSignal             CHOICE {
    csi-rs             NZP-CSI-RS-ResourceId,
    ssb                SSB-Index
  },
  qcl-Type              ENUMERATED {typeA, typeB, typeC, typeD},
  ...
}
-- TAG-TCI-STATE-STOP
-- ASN1STOP
```

It is envisioned that when a unified TCI framework is introduced, TCI states may be used to indicate a spatial relation in the UL. The TCI states may be defined separately for UL and DL or common TCI states are defined for both DL and UL.

PUCCH Power Control in NR

PUCCH power control is used to determine a proper PUCCH transmit power level at a WD. Power control generally includes two parts, i.e., open-loop power control and closed-loop power control. Open-loop power control is used to set the uplink transmit power based on an estimated downlink pathloss (PL) between the gNB and the WD, a target receive power, PUCCH format, uplink control information (UCI) payload, etc.

Closed-loop power control is based on transmit power control (TPC) commands received from the gNB. A closed loop adjustment at a given time is also referred as a power control adjustment state.

Downlink pathloss is estimated based on a DL RS and is equal to the difference between the transmitted and received power measured on the DL RS at a WD. The DL RS is referred to as a DL pathloss reference RS. A DL pathloss reference RS can be a CSI-RS or SSB.

If a WD transmits a PUCCH in a PUCCH resource on active UL BWP b of carrier f in the primary cell c using PUCCH power control adjustment state with index l (l=0,1), the WD determines the PUCCH transmission power $P_{PUCCH,b,f,c}(i,q_u,q_d,l)$ in PUCCH transmission occasion i as:

$$P_{PUCCH,b,f,c}(i, q_u, q_d, l)(\text{dBm}) = \min\begin{cases} P_{CMAX,f,c}(i) \\ P_{open-loop,b,f,c}(i, q_u, q_d) + P_{closed-loop,b,f,c}(i, l) \end{cases}$$

where $P_{CMAX,f,c}(i)$ is the configured WD maximum output power defined in section 8-1 of 3GPP Technical Specification (TS) 38.101-1, section 8-2 of 3GPP TS 38.101-2, and section 8-3 of 3GPP TS 38.101-3 for carrier f of primary cell c in PUCCH transmission occasion i. $P_{open-loop,b,f,c}(i,q_u,q_d)$ is the open loop power adjustment and may be given by:

$$P_{open-loop,b,f,c}(i,q_u,q_d)=P_{O\_PUCCH,b,f,c}(q_u)+PL_{b,f,c}(q_d)+P_{RB}(i)+\Delta_{F\_PUCCH}(F)+\Delta_{TF,b,f,c}(i)$$

where, $P_{O\_PUCCH,b,f,c}(q_u)=P_{O\_NOMINAL\_PUCCH}+P_{O\_UE\_PUCCH}(q_u)$ is a nominal target receive power in dBm; and $P_{O\_NOMINAL\_PUCCH}$ is a cell specific component and $P_{O\_UE\_PUCCH}(q_u)$ is a WD specific component. $P_{O\_NOMINAL\_PUCCH}$ is provided by a higher layer parameter p0-nominal, or, $P_{O\_NOMINAL\_PUCCH}=0$ if p0-nominal is not configured.

$P_{O\_UE\_PUCCH}(q_u)$ is provided by a higher layer parameter p0-PUCCH-Value in P0-PUCCH with index $q_u$ for active UL BWP b of carrier f of primary cell c, where $0 \le q_u < Q_u$, $Q_u$ is a size for a set of P0-PUCCH provided by a higher layer parameter maxNrofPUCCH-P0-perSet. The set of P0-PUCCH is provided by a higher layer parameter p0-Set as shown in the PUCCH PowerControl information element below:

If p0-Set is not configured, $P_{O\_UE\_PUCCH}(q_u)=0$;

$P_{RB}(i)$ is a power adjustment related to the number of RBs occupied in a transmission occasion i;

$PL_{b,f,c}(q_d)$ is the estimated pathloss in dB by the WD using a PUCCH pathloss reference RS with index $q_d$ for the active DL BWP b of carrier f of primary cell c;

$\Delta_{F\_PUCCH}(F)$ is a PUCCH format dependent power adjustment; and $\Delta_{TF,b,f,c}(i)$ is a power adjustment related to the PUCCH resource on active UL BWP b of carrier f of primary cell c.

$P_{closed\text{-}loop}(i,l)$ is a closed-loop power adjustment and may be given by:

$$P_{closed-loop}(i,l)=g_{b,f,c}(i,l)=g_{b,f,c}(i-i_0,l)+\sum_{m=0}^{M}\delta_{PUCCH,b,f,c}(m,l)$$

Where:

$g_{b,f,c}(i,l)$ is the PUCCH power control adjustment state with index l for active UL BWP b of carrier f of primary cell c at PUCCH transmission occasion i;

$\delta_{PUCCH,b,f,c}(i,l)$ is a TPC command value included in a DCI format (i.e., DCI formats 1_0, 1_1 or 1_2) scheduling a PDSCH reception for active UL BWP b of carrier f of the primary cell c that the WD detects for PUCCH transmission occasion i, or is jointly coded with other TPC commands in a DCI format 2_2 with CRC scrambled by TPC-PUCCH-RNTI according to Clause 11.3 of 3GPP TS 36.212; and $$\sum_{m=0}^{M}\delta_{PUCCH,b,f,c}(i,m)$$

is a sum of TPC command values that the WD receives between $K_{PUCCH}(i-i_0)-1$ symbols before PUCCH transmission occasion $i-i_0$ and $K_{PUCCH}(i)$ symbols before PUCCH transmission i on active UL BWP b of carrier f of the primary cell c for PUCCH power control adjustment state with index l, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i. If the PUCCH transmission is in response to a detection by the WD of a DCI format, $K_{PUCCH}(i)$ is a number of symbols after a last symbol of a corresponding PDCCH reception and before a first symbol of the PUCCH transmission. Otherwise, $$K_{PUCCH}(i)=k_{2,min}\cdot N_{symb}^{slot},$$

where $k_{2,min}$ is the minimum number of slots configured between a PDCCH and its scheduled PUSCH, $$N_{symb}^{slot}$$

is the number of symbols in a slot.

The closed-loop index l, PUCCH pathloss reference RS index $q_d$, and a P0-PUCCH index $q_u$ are configured in a PUCCH spatial relation, as shown in in the IE above, activated for the PUCCH resource.

If the WD is not provided twoPUCCH-PC-AdjustmentStates or PUCCH-SpatialRelationInfo, l=0.

If the WD is not provided PUCCH-SpatialRelationInfo, the WD obtains the p0-PUCCH-Value value from the P0-PUCCH with p0-PUCCH-Id value equal to the minimum p0-PUCCH-Id value in p0-Set.

If the WD is not provided PUCCH-SpatialRelationInfo, but a set of PUCCH pathloss RSs is configured, then the PUCCH pathloss reference RS in the first entry (i.e., with index=0) in the list may be used.

If both PUCCH pathloss reference RS and PUCCH-SpatialRelationInfo are not configured, but the WD is configured with enableDefaultBeamPlForPUCCH, then the pathloss reference RS is a periodic RS resource with 'QCL-TypeD' in the TCI state of a control resource set (CORESET) with the lowest index in the active DL BWP of the primary cell.

If the WD is not provided pathlossReferenceRSs, then the pathloss reference RS may be an SS/PBCH block with same SSB index as the one the WD uses to obtain the master information block (MIB).

PUCCH power control related parameters are signaled to a WD in a PUCCH-PowerControl information element, which is shown below.

PUCCH-PowerControl information element

```
-- ASN1START
-- TAG-PUCCH-POWERCONTROL-START
PUCCH-PowerControl ::=      SEQUENCE {
  deltaF-PUCCH-f0           INTEGER (−16..15)   OPTIONAL, -- Need R
  deltaF-PUCCH-f1           INTEGER (−16..15)   OPTIONAL, -- Need R
  deltaF-PUCCH-f2           INTEGER (−16..15)   OPTIONAL, -- Need R
  deltaF-PUCCH-f3           INTEGER (−16..15)   OPTIONAL, -- Need R
  deltaF-PUCCH-f4           INTEGER (−16..15)   OPTIONAL, -- Need R
```

-continued

```
PUCCH-PowerControl information element

  p0-Set              SEQUENCE (SIZE (1..maxNrofPUCCH-P0-PerSet)) OF
P0-PUCCH
                    OPTIONAL, -- Need M
  pathlossReferenceRSs         SEQUENCE (SIZE (1..maxNrofPUCCH-
PathlossReferenceRSs)) OF PUCCH-PathlossReferenceRS
                                              OPTIONAL, -- Need M
  twoPUCCH-PC-AdjustmentStates         ENUMERATED {twoStates}
OPTIONAL, -- Need S
  ...,
  [[
  pathlossReferenceRSs-v1610            SetupRelease { PathlossReferenceRSs-v1610 }
OPTIONAL -- Need M
  ]]
}
P0-PUCCH ::=                 SEQUENCE {
  p0-PUCCH-Id                   ,
  p0-PUCCH-Value                    INTEGER (−16..15)
}
P0-PUCCH-Id ::=              INTEGER (1..8)
PathlossReferenceRSs-v1610 ::=          SEQUENCE (SIZE (1..maxNrofPUCCH-
PathlossReferenceRSsDiff-r16)) OF PUCCH-PathlossReferenceRS-r16
PUCCH-PathlossReferenceRS ::=                   SEQUENCE {
  pucch-PathlossReferenceRS-Id                      ,
  referenceSignal                  CHOICE {
    ssb-Index                        SSB-Index,
    csi-RS-Index                          NZP-CSI-RS-ResourceId
  }
}
PUCCH-PathlossReferenceRS-r16 ::=                   SEQUENCE {
  pucch-PathlossReferenceRS-Id-r16                  PUCCH-PathlossReferenceRS-Id-
v1610,
  referenceSignal-r16                     CHOICE {
    ssb-Index-r16                         SSB-Index,
    csi-RS-Index-r16                        NZP-CSI-RS-ResourceId
  }
}
-- TAG-PUCCH-POWERCONTROL-STOP
-- ASN1STOP
```

UL Transmission to Multiple Transmission Points (TRPs)

In 3GPP NR Rel-17, it has been considered to introduce UL enhancement with multiple TRPs by transmitting a PUCCH towards different TRPs in different times, or PUCCH repetition to multiple TRPs. An example is shown in FIG. 3.

It has been considered that two SRS resource sets with usage set to "codebook" or "non-codebook" will be introduced in NR 3GPP Release 17 (3GPP Rel-17) for PUSCH repetition to two TRPs. Since the propagation channels to the two TRPs can be quite different, it has been considered in 3GPP RAN1 that for PUCCH repetition to multiple TRPs in FR1, two sets of power control parameters are used, and each set has a dedicated value of p0, a pathloss reference RS ID and a closed-loop index. The related consideration is given below:

"To support per TRP power control for multi-TRP PUCCH schemes in FR1:

- Two sets of power control parameters are used, and each set has a dedicated value of p0, pathloss RS ID and a closed-loop index;
- For further study (FFS): details on how a PUCCH resource can be linked to one or both of the two sets of power control parameters; and
- FFS: whether a PUCCH resource group can be linked to power control parameter sets."

SUMMARY

Some embodiments advantageously provide methods, systems, and apparatuses for PUCCH power control towards multiple TRPs.

In one embodiment, a network node is configured to send a medium access control, MAC, control element, CE, to the WD, the MAC CE indicating an association between i) one of a physical uplink control channel, PUCCH, resource and a PUCCH resource group; and ii) at least one first PUCCH power control parameter set out of a plurality of PUCCH power control parameter sets; and optionally, receive a PUCCH transmission from the WD on the one of the PUCCH resource and the PUCCH resource group, the PUCCH transmission comprising a transmit power level based on the at least one first PUCCH power control parameter set that is associated to the one of the PUCCH resource and the PUCCH resource group.

In one embodiment, a wireless device (WD) is configured to receive a medium access control, MAC, control element, CE, the MAC CE indicating an association between i) one of a physical uplink control channel, PUCCH, resource and a PUCCH resource group; and ii) at least one first PUCCH power control parameter set out of a plurality of PUCCH power control parameter sets; and optionally, transmit a PUCCH transmission on the one of the PUCCH resource and the PUCCH resource group, the PUCCH transmission comprising a transmit power level based on the at least one first PUCCH power control parameter set that is associated to the one of the PUCCH resource and the PUCCH resource group.

According to one aspect, a method in a network node includes: configuring the WD with a list of at least two power control parameter sets for power control of a physical uplink control channel, PUCCH, applicable to at least one of at least one PUCCH resource and at least one group of PUCCH resources. The process also includes transmitting a medium access control, MAC, control element, CE, to the WD to activate at least one power control parameter set from the list of power control parameter sets applicable to at least one of (1) one PUCCH resource, (2) each one of multiple PUCCH resources, and (3) multiple groups of PUCCH resources.

According to this aspect, in some embodiments, each of the list of at least two power control parameter set includes a PUCCH pathloss reference signal identifier, ID, a target receive power, P0-PUCCH, ID, a closed-loop index, and a power control parameter set ID. In some embodiments, the method also includes configuring the WD with PUCCH repetition to at least one transmission and reception point, TRP, each TRP associated with at least one of the at least two power control parameter sets. In some embodiments, the MAC CE includes a PUCCH resource identifier including two bit fields, each bit field identifying a respective PUCCH power control parameter set from the list of at least two control parameter sets. In some embodiments, the MAC CE comprises a bit field that indicates whether one of two PUCCH power control sets and a single PUCCH power control set is activated for the at least one of (1) one PUCCH resource, (2) each one of the multiple PUCCH resources, and (3) the multiple groups of PUCCH resources. In some embodiments, the MAC CE includes: a spatial relation information ID field in an octet, the spatial relation information ID field identifying the spatial relation activated for the one of a PUCCH resource from the multiple PUCCH resources and a group of PUCCH resources from the multiple groups of PUCCH resources that is identified in a PUCCH resource index field in a previous octet. In some embodiments, the MAC CE includes: a field, E, in a first octet indicating whether a PUCCH resource is being updated by a spatial relation or a power control set; a PUCCH resource index field in a second octet identifying the one of a PUCCH resource from the multiple PUCCH resources and a group of PUCCH resources from the multiple groups of PUCCH resources; and a third octet subsequent to the second octet, the third octet comprising a spatial relation information identifier, ID, field identifying a spatial relation and an S field identifying a PUCCH power control parameter set; and wherein, based at least in part on a value comprised in the field, E, one of the spatial relation and the S field is activated for the one of the PUCCH resource and the group of PUCCH resources identified by the PUCCH resource index field in the second octet. In some embodiments, at least two PUCCH spatial relations are configured to the WD, each PUCCH spatial relation comprising a PUCCH pathloss reference identifier, ID, a P0-PUCCH ID and a closed-loop index. In some embodiments, the MAC CE includes: a bandwidth part, BWP, field, a serving cell identifier, ID, field in a first octet; a field indicating whether one of one set and two sets of PUCCH power control parameters are activated; a 7-bit PUCCH resource index field in a second octet; and a dedicated field for each of the two sets of PUCCH power control parameters in a third octet. In some embodiments, each PUCCH power control parameter set comprises power control parameters for the WD to calculate PUCCH transmit power toward a corresponding transmit receive point, TRP, associated with the network node.

According to another aspect, a network node configured to communicate with a wireless device includes: processing circuitry configured to configure the WD with a list of at least two power control parameter sets for power control of a physical uplink control channel, PUCCH, applicable to at least one of at least one PUCCH resource and at least one group of PUCCH resources; and a radio interface in communication with the processing circuitry and configured to transmit a medium access control, MAC, control element, CE, to the WD to activate at least one power control parameter set from the list of power control parameter sets applicable to at least one of (1) one PUCCH resource, (2) each one of multiple PUCCH resources, and (3) multiple groups of PUCCH resources.

According to this aspect, in some embodiments, each of the list of at least two power control parameter set includes a PUCCH pathloss reference signal identifier, ID, a target receive power, P0-PUCCH, ID, a closed-loop index, and a power control parameter set ID. In some embodiments, the processing circuitry is configured to configure the WD with PUCCH repetition to at least one transmission and reception point, TRP, each TRP associated with at least one of the at least two power control parameter sets. In some embodiments, the MAC CE includes a PUCCH resource identifier including two bit fields, each bit field identifying a respective PUCCH power control parameter set from the list of at least two control parameter sets. In some embodiments, the MAC CE comprises a bit field that indicates whether one of two PUCCH power control sets and a single PUCCH power control set is activated for the at least one of (1) one PUCCH resource, (2) each one of the multiple PUCCH resources, and (3) the multiple groups of PUCCH resources. In some embodiments, the MAC CE includes: a spatial relation information ID field in an octet, the spatial relation information ID field identifying the spatial relation activated for the one of a PUCCH resource from the multiple PUCCH resources and a group of PUCCH resources from the multiple groups of PUCCH resources that is identified in a PUCCH resource index field in a previous octet. In some embodiments, the MAC CE includes: a field, E, in a first octet indicating whether a PUCCH resource is being updated by a spatial relation or a power control set; a PUCCH resource index field in a second octet identifying the one of a PUCCH resource from the multiple PUCCH resources and a group of PUCCH resources from the multiple groups of PUCCH resources; and a third octet subsequent to the second octet, the third octet comprising a spatial relation information identifier, ID, field identifying a spatial relation and an S field identifying a PUCCH power control parameter set; and wherein, based at least in part on a value comprised in the field, E, one of the spatial relation and the S field is activated for the one of the PUCCH resource and the group of PUCCH resources identified by the PUCCH resource index field in the second octet. In some embodiments, at least two PUCCH spatial relations are configured to the WD, each PUCCH spatial relation comprising a PUCCH pathloss reference identifier, ID, a P0-PUCCH ID and a closed-loop index. In some embodiments, the MAC CE includes: a bandwidth part, BWP, field, a serving cell identifier, ID, field in a first octet; a field indicating whether one of one set and two sets of PUCCH power control parameters are activated; a 7-bit PUCCH resource index field in a second octet; and a dedicated field for each of the two sets of PUCCH power control parameters in a third octet. In some embodiments, each PUCCH power control parameter set comprises power control parameters for the WD to calculate PUCCH transmit power toward a corresponding transmit receive point, TRP, associated with the network node.

According to yet another aspect, a method in a wireless device includes receiving a configuration of a list of at least two power control parameter sets for power control of a physical uplink control channel, PUCCH, applicable to at least one of at least one PUCCH resource and at least one group of PUCCH resources. The process also includes setting a transmit power level based at least in part on at least one of the at least two power control parameter sets in the list.

In some embodiments, each of the list of at least two power control parameter set comprises a PUCCH pathloss reference signal identifier, ID, a target receive power, P0-PUCCH, ID, a closed-loop index, and a power control parameter set ID. In some embodiments, the method also includes configuring the WD (22) with PUCCH repetition to at least one transmission and reception point, TRP, each TRP associated with at least one of the at least two power control parameter sets. In some embodiments, the MAC CE includes a PUCCH resource identifier including two bit fields, each bit field identifying a respective PUCCH power control parameter set from the list of at least two control parameter sets. In some embodiments, the MAC CE comprises a bit field that indicates whether one of two PUCCH power control sets and a single PUCCH power control set is activated for the at least one of (1) one PUCCH resource, (2) each one of the multiple PUCCH resources, and (3) the multiple groups of PUCCH resources. In some embodiments, the MAC CE includes: a spatial relation information ID field in an octet, the spatial relation information ID field identifying the spatial relation activated for the one of a PUCCH resource from the multiple PUCCH resources and a group of PUCCH resources from the multiple groups of PUCCH resources that is identified in a PUCCH resource index field in a previous octet. In some embodiments, the MAC CE includes: a field, E, in a first octet indicating whether a PUCCH resource is being updated by a spatial relation or a power control set; a PUCCH resource index field in a second octet identifying the one of a PUCCH resource from the multiple PUCCH resources and a group of PUCCH resources from the multiple groups of PUCCH resources; and a third octet subsequent to the second octet, the third octet comprising a spatial relation information identifier, ID, field identifying a spatial relation and an S field identifying a PUCCH power control parameter set; and wherein, based at least in part on a value comprised in the field, E, one of the spatial relation and the S field is activated for the one of the PUCCH resource and the group of PUCCH resources identified by the PUCCH resource index field in the second octet. In some embodiments, the MAC CE is further configured to configure at least two PUCCH spatial relations, each PUCCH spatial relation comprising a PUCCH pathloss reference identifier, ID, a P0-PUCCH ID and a closed-loop index. In some embodiments, the MAC CE includes: a bandwidth part, BWP, field, a serving cell identifier, ID, field in a first octet; a field indicating whether one of one set and two sets of PUCCH power control parameters are activated; a 7-bit PUCCH resource index field in a second octet; and a dedicated field for each of the two sets of PUCCH power control parameters in a third octet. In some embodiments, each PUCCH power control parameter set comprises power control parameters for the WD to calculate PUCCH transmit power toward a corresponding transmit receive point, TRP, associated with the network node.

According to another aspect, a wireless device configured to communicate with a network node, includes: a radio interface configured to receive a configuration of a list of at least two power control parameter sets for power control of a physical uplink control channel, PUCCH, applicable to at least one of at least one PUCCH resource and at least one group of PUCCH resources; and processing circuitry in communication with the radio interface and configured to set a transmit power level based at least in part on at least one of the at least two power control parameter sets in the list.

In some embodiments, each of the list of at least two power control parameter set comprises a PUCCH pathloss reference signal identifier, ID, a target receive power, P0-PUCCH, ID, a closed-loop index, and a power control parameter set ID. In some embodiments, the processing circuitry is also configured to configure the WD with PUCCH repetition to at least one transmission and reception point, TRP, each TRP associated with at least one of the at least two power control parameter sets. In some embodiments, the MAC CE includes a PUCCH resource identifier including two bit fields, each bit field identifying a respective PUCCH power control parameter set from the list of at least two control parameter sets. In some embodiments, the MAC CE comprises a bit field that indicates whether one of two PUCCH power control sets and a single PUCCH power control set is activated for the at least one of (1) one PUCCH resource, (2) each one of the multiple PUCCH resources, and (3) the multiple groups of PUCCH resources. In some embodiments, the MAC CE includes: a spatial relation information ID field in an octet, the spatial relation information ID field identifying the spatial relation activated for the one of a PUCCH resource from the multiple PUCCH resources and a group of PUCCH resources from the multiple groups of PUCCH resources that is identified in a PUCCH resource index field in a previous octet. In some embodiments, the MAC CE includes: a field, E, in a first octet indicating whether a PUCCH resource is being updated by a spatial relation or a power control set; a PUCCH resource index field in a second octet identifying the one of a PUCCH resource from the multiple PUCCH resources and a group of PUCCH resources from the multiple groups of PUCCH resources; and a third octet subsequent to the second octet, the third octet comprising a spatial relation information identifier, ID, field identifying a spatial relation and an S field identifying a PUCCH power control parameter set; and wherein, based at least in part on a value comprised in the field, E, one of the spatial relation and the S field is activated for the one of the PUCCH resource and the group of PUCCH resources identified by the PUCCH resource index field in the second octet. In some embodiments, the MAC CE is further configured to configure at least two PUCCH spatial relations, each PUCCH spatial relation comprising a PUCCH pathloss reference identifier, ID, a P0-PUCCH ID and a closed-loop index. In some embodiments, the MAC CE includes: a bandwidth part, BWP, field, a serving cell identifier, ID, field in a first octet; a field indicating whether one of one set and two sets of PUCCH power control parameters are activated; a 7-bit PUCCH resource index field in a second octet; and a dedicated field for each of the two sets of PUCCH power control parameters in a third octet. In some embodiments, each PUCCH power control parameter set comprises power control parameters for the WD to calculate PUCCH transmit power toward a corresponding transmit receive point, TRP, associated with the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a flowchart of an example process in a network node according to some embodiments of the present disclosure; and FIG. 11 is a flowchart of an example process in a wireless device according to some embodiments of the present disclosure;

FIG. 12 is a flowchart of an example process in a network node according to principles set forth herein;

FIG. 13 is a flowchart of an example process in a WD according to principles set forth herein;

FIG. 20 is a flowchart according to one embodiment of the present disclosure.

DETAILED DESCRIPTION

Figures 1, 2:
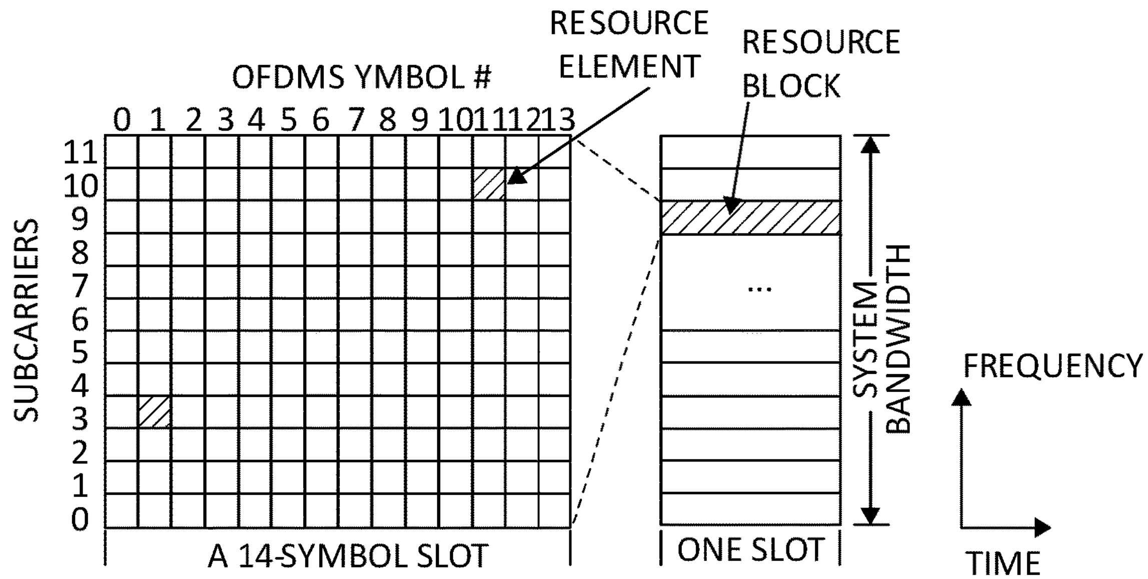
FIG. 1 illustrates an example of NR time-domain structure with 15 kHz subcarrier spacing.
FIG. 2 illustrates an example of NR physical resource grid.
Figure 3:
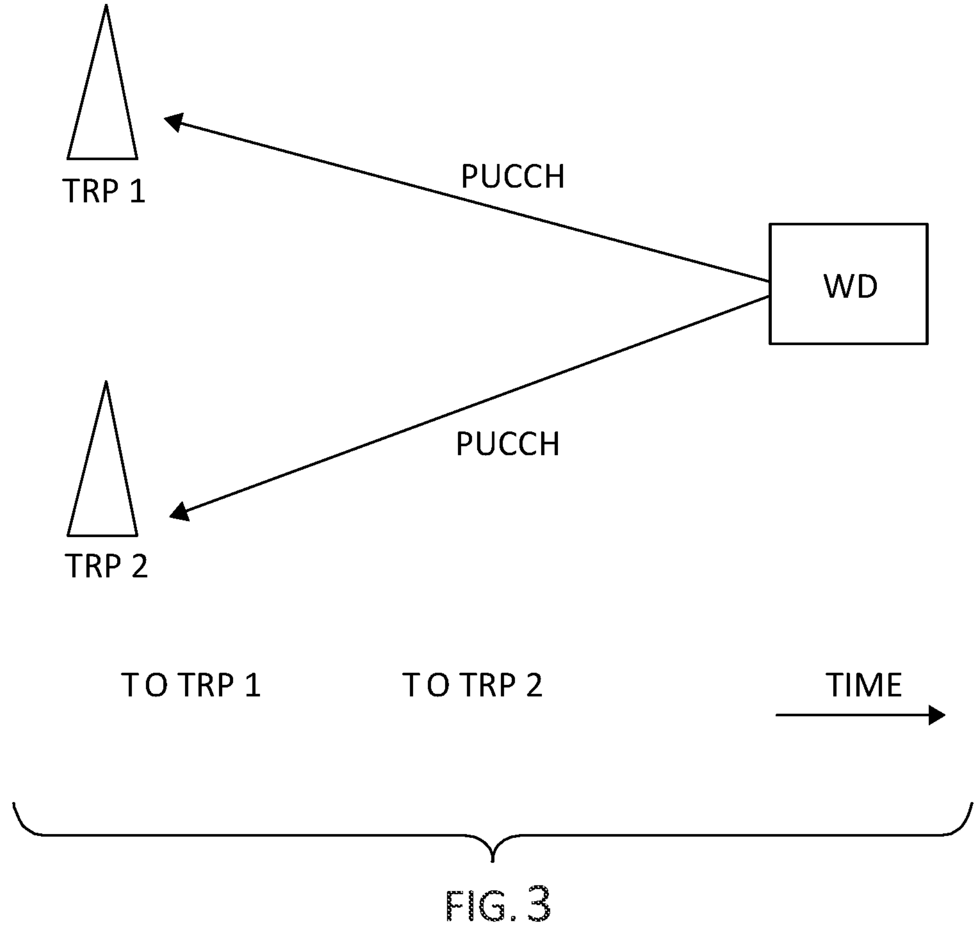
FIG. 3 illustrates an example of PUCCH repetition towards multiple TRPs.

In NR 3GPP Release 15/16 (3GPP Rel-15/16), PUCCH spatial relation may not be configured in FR1 and a WD may assume closed-loop index l=0, P0-PUCCH in p0-Set with the minimum p0-PUCCH-Id value, and PUCCH pathloss reference RS with index=0. For PUCCH repetition to multiple TRPs and two sets of power control parameters configured in FR1, how to link a PUCCH resource to one of the two sets is an open issue.

Some embodiments may include arrangements for linking and/or associating a PUCCH resource to one of two (or more) sets of PUCCH power control parameters, e.g., when PUCCH spatial relation is not configured, typically in FR1. In some embodiments, the two sets of PUCCH power control parameters may be explicitly configured with each set being identified by a set index value. Each PUCCH resource may be activated/updated with a MAC CE with one of or both sets of PUCCH power control parameters.

In some embodiments, for PUCCH repetitions towards multiple TRPs and when PUCCH spatial relation is not configured, two (or more) sets of PUCCH power control parameters are explicitly configured (in e.g., PUCCH-PowerControl IE) each with a set index, or more particularly a set index value. In some embodiments, for each PUCCH resource (or group of PUCCH resources), a MAC CE is used to link the PUCCH resource (or group of PUCCH resources) to one of or both the two sets of PUCCH power control parameters.

In one embodiment, the MAC CE comprises one or more of: a BWP field of 2 bits, a serving cell identifier (ID) field of 5 bits, and a first reserved bit in a first octet; a PUCCH resource index field of 7 bits and a second reserved bit in a second octet, and a dedicated field of 1 bit for each of the two sets PUCCH power control parameters in a third octet. A set is activated for (or linked to or associated to) the PUCCH resource (or group of PUCCH resources) if the corresponding field is set to 1 and deactivated (or link removed or de-associated) if the corresponding field is set to 0.

In another embodiment, the above applies only if the first reserved bit is set to 1. Otherwise, the fields for the two sets of power control parameters are ignored.

Alternatively, or additionally, the second reserved bit is used to indicated whether the third octet is present or not. If the third octet is not present (e.g., when the second reserved bit is set to 0), both of the two sets are activated (or deactivated) when the first reserved bit is set to 1 (or 0).

In yet another embodiment, the MAC CE comprises one or more of: a BWP field of 2 bits and a serving cell ID field of 5 bits, and a first set indicator field of 1 bit in a first octet, and a PUCCH resource index field of 7 bits and a second set indicator field of 1 bit in a second octet. If the first set indicator field is set to 1, the PUCCH resource (or group of PUCCH resources) is activated with both of the two sets and the second bit field is ignored. If the first bit field is set to 0, the second bit field is used to activated one of the two sets for the PUCCH resource (or group of PUCCH resources).

In some embodiments, when both of the two sets are activated for a PUCCH resource, PUCCH transmission scheduled in the PUCCH resource is repeated towards the two or more TRPs at different times, e.g., a first set is applied to PUCCH transmission occasions to a first TRP and a second set is applied to PUCCH transmission occasions to a second TRP.

Some embodiments may enable per TRP PUCCH power control towards different TRPs, especially when PUCCH spatial relation is not configured, which is typically the case in FR1.

Before describing in detail example embodiments, it is noted that the embodiments reside primarily in combinations of apparatus components and processing steps related to PUCCH power control towards multiple TRPs. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Although the description herein may be explained in the context of a PUCCH channel, it should be understood that the principles may also be applicable to other channels, such as, for example, PUSCH.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g., representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g., representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based at least in part on position and/or resource used for transmission. Explicit indication may for example be based at least in part on a parametrization with one or more parameters, and/or one or more index or indices corresponding to a table, and/or one or more bit patterns representing the information.

Configuring a radio node, in particular a terminal or WD (e.g., WD), may refer to the radio node being adapted or caused or set and/or instructed to operate according to the configuration. Configuring may be done by another device, e.g., a network node (e.g., network node) (for example, a base station or gNB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., WD) may comprise scheduling downlink and/or uplink transmissions for the terminal, e.g., downlink data and/or downlink control signaling and/or DCI and/or uplink control or data or communication signaling, in particular acknowledgement signaling, and/or configuring resources and/or a resource pool therefor. In particular, configuring a terminal (e.g., WD) may comprise configuring the WD to perform certain measurements on certain subframes or radio resources and reporting such measurements according to embodiments of the present disclosure.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

The term time or time resource used herein may correspond to any type of physical resource or radio resource expressed in terms of length of time. Examples of time resources are: symbol, time slot, sub-slot, subframe, radio frame, TTI, interleaving time, etc. As used herein, in some embodiments, the terms "subframe," "slot," "sub-slot", "sub-frame/slot" and "time resource" are used interchangeably and are intended to indicate a time resource and/or a time resource number.

A cell may be generally a communication cell, e.g., of a cellular or mobile communication network, provided by a node. A serving cell may be a cell on or via which a network node (the node providing or associated to the cell, e.g., base station or gNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE or NR standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or gNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or gNodeB, may be adapted to provide and/or define and/or control one or more cells, e.g., a PCell and/or a LA cell.

Predefined in the context of this disclosure may refer to the related information being defined for example in a standard, and/or being available without specific configuration from a network or network node, e.g., stored in memory, for example independent of being configured. Configured or configurable may be considered to pertain to the corresponding information being set/configured, e.g., by the network or a network node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
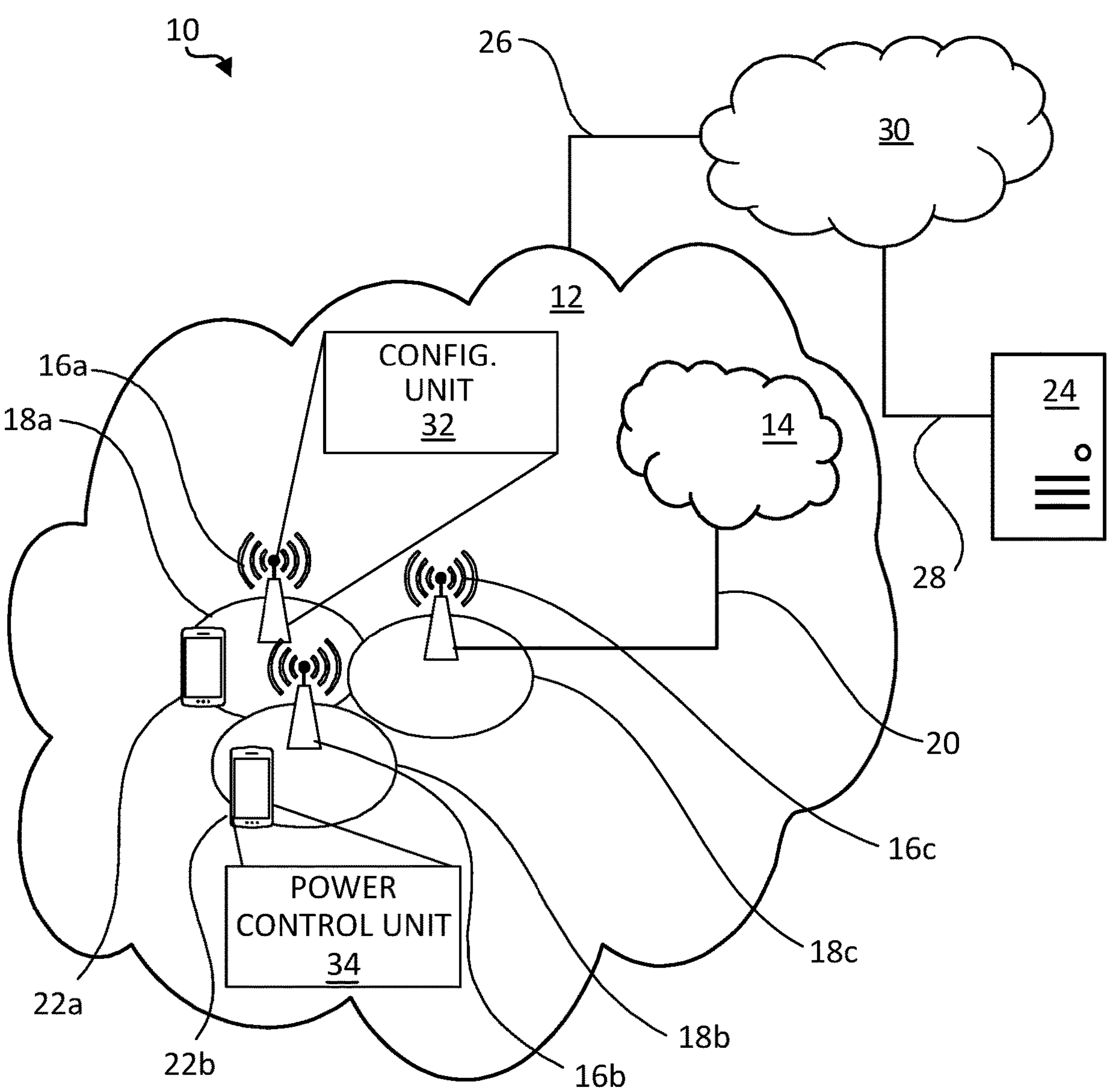
FIG. 4 is a schematic diagram of an example network architecture illustrating a communication system connected via an intermediate network to a host computer according to the principles in the present disclosure.

Some embodiments provide arrangements for PUCCH power control towards multiple TRPs. Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. Network nodes 16 are also referred to herein as TRP 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a configuration unit 32 which is configured to configure the WD with a list of at least two power control parameter sets for power control of a physical uplink control channel, PUCCH, applicable to at least one of at least one PUCCH resource and at least one group of PUCCH resources.

A wireless device 22 is configured to include a power control unit 34 which is configured to set a transmit power level based at least in part on at least one of the at least two power control parameter sets in the list.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a configuration unit 32 which is configured to configure the WD with a list of at least two power control parameter sets for power control of a physical uplink control channel, PUCCH, applicable to at least one of at least one PUCCH resource and at least one group of PUCCH resources. In some embodiments, the configuration unit 32 is configured to perform network node methods discussed herein, such as the methods discussed with reference to FIG. 10 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a power control unit 34 which is configured to set a transmit power level based at least in part on at least one of the at least two power control parameter sets in the list. In some embodiments, the power control unit 34 is configured to perform WD methods discussed herein, such as the methods discussed with reference to FIG. 11 as well as other figures.

Figure 5:
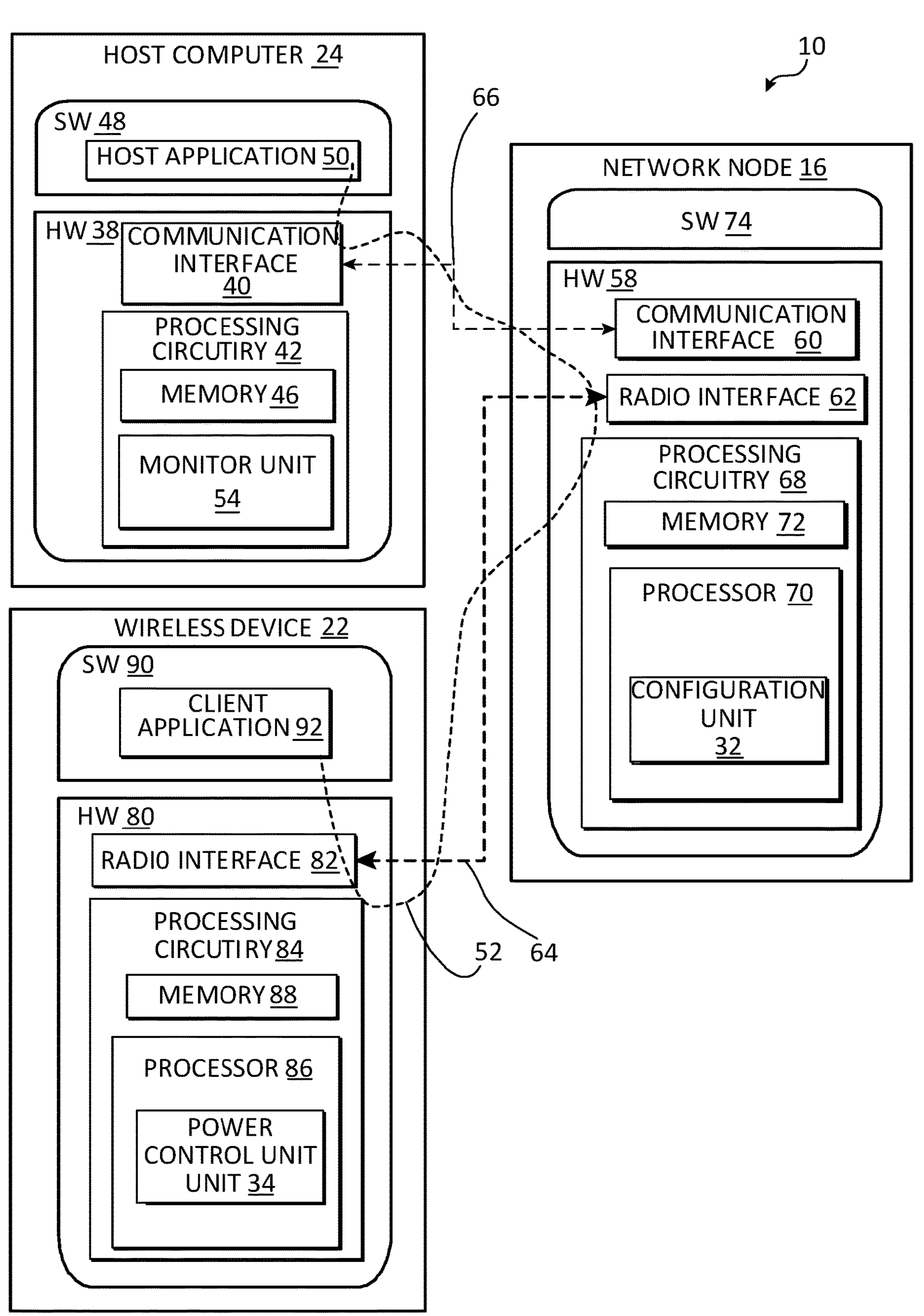
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as configuration unit 32, and power control unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
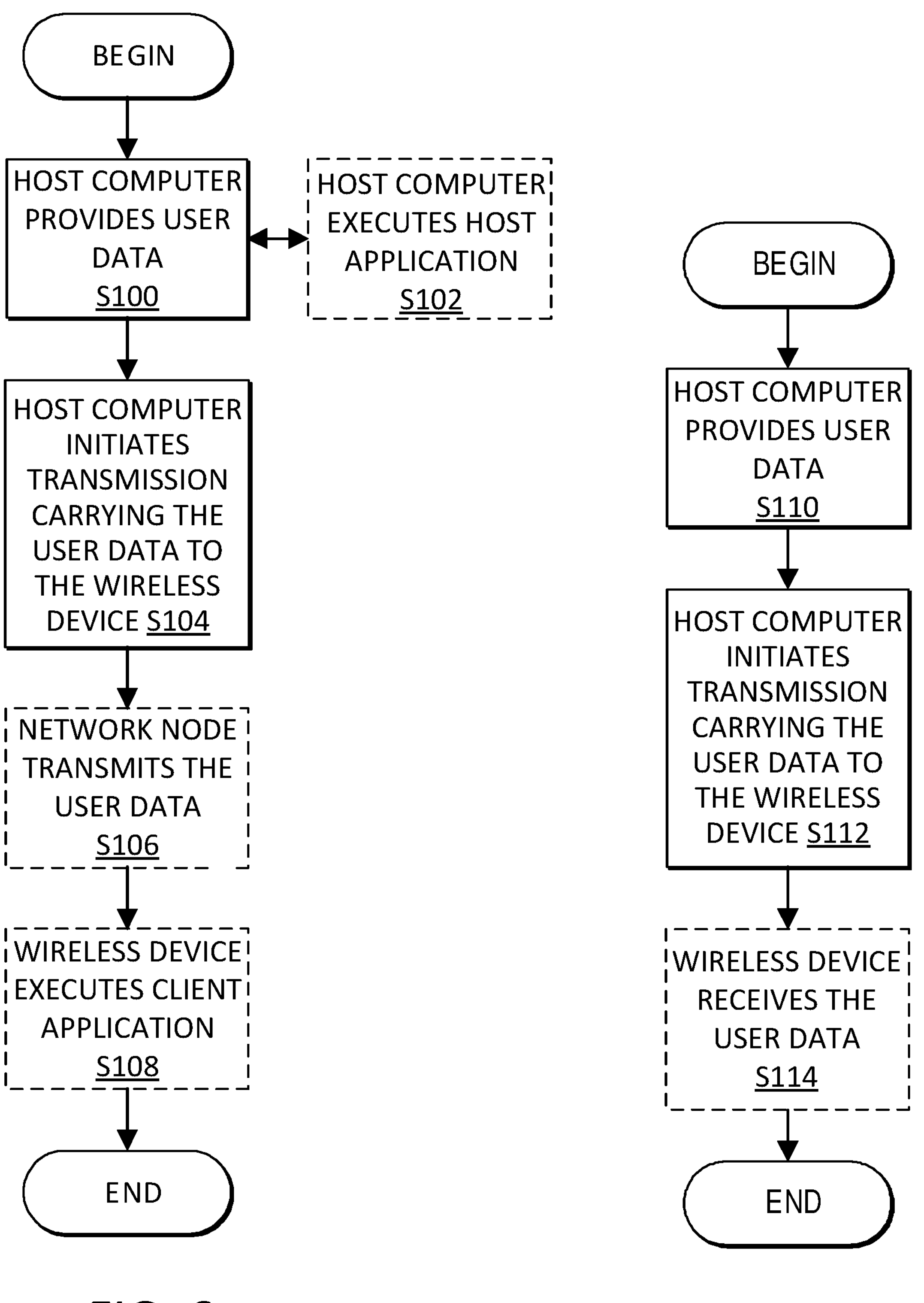
FIG. 6 is a flowchart illustrating example methods implemented in a communication system including a host computer, a network node and a wireless device for executing a client application at a wireless device according to some embodiments of the present disclosure.
FIG. 7 is a flowchart illustrating example methods implemented in a communication system including a host computer, a network node and a wireless device for receiving user data at a wireless device according to some embodiments of the present disclosure.

FIG. 6 is a flowchart illustrating an example method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 8, 9:
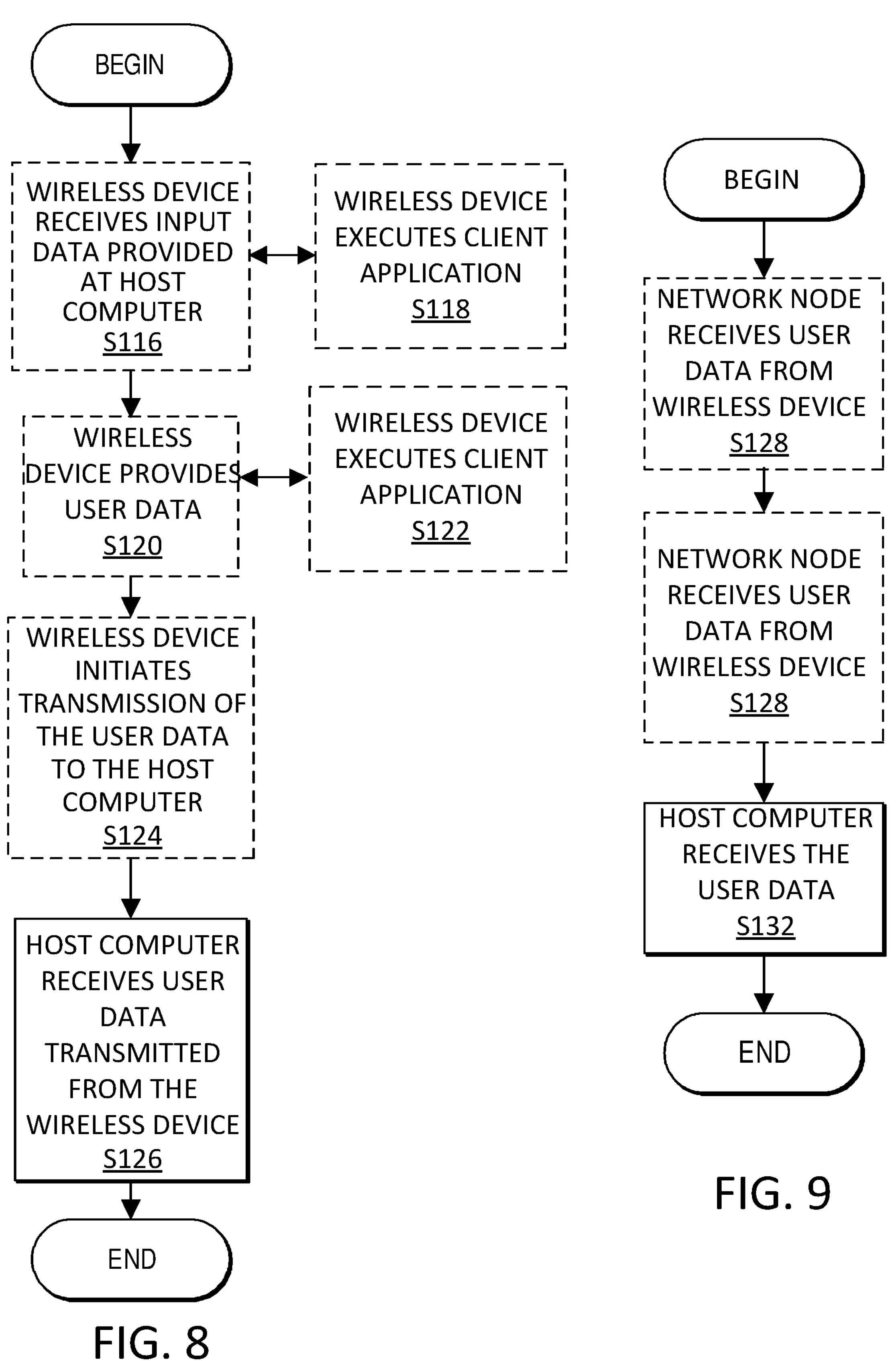
FIG. 8 is a flowchart illustrating example methods implemented in a communication system including a host computer, a network node and a wireless device for receiving user data from the wireless device at a host computer according to some embodiments of the present disclosure.
FIG. 9 is a flowchart illustrating example methods implemented in a communication system including a host computer, a network node and a wireless device for receiving user data at a host computer according to some embodiments of the present disclosure.

FIG. 8 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 10 is a flowchart of an example process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. Network node 16 such as via processing circuitry 68 and/or processor 70 and/or radio interface 62 and/or communication interface 60 is configured to perform at least one of the steps in Blocks S134 and S136. The example method includes sending (Block S134), such as via configuration unit 32, processing circuitry 68, processor 70, communication interface 60 and/or radio interface 62, a medium access control, MAC, control element, CE, to the WD, the MAC CE indicating an association between i) one of a physical uplink control channel, PUCCH, resource and a PUCCH resource group; and ii) at least one first PUCCH power control parameter set out of a plurality of PUCCH power control parameter sets. The method includes optionally, receiving (Block S136), such as via configuration unit 32, processing circuitry 68, processor 70, communication interface 60 and/or radio interface 62, a PUCCH transmission from the WD on the one of the PUCCH resource and the PUCCH resource group, the PUCCH transmission comprising a transmit power level based on the at least one first PUCCH power control parameter set that is associated to the one of the PUCCH resource and the PUCCH resource group.

In some embodiments, the method further includes configuring, such as via configuration unit 32, processing circuitry 68, processor 70, communication interface 60 and/or radio interface 62, the WD with at least two PUCCH power control parameter sets. In some embodiments, the MAC CE comprises a n-bit field, S, each bit in the n-bit field, S, corresponding to a respective PUCCH power control parameter set and wherein each PUCCH power control parameter set is one of activated and deactivated based on a value in the corresponding bit. In some embodiments, n is 2.

In some embodiments, the MAC CE comprises a 1-bit activation/deactivation field indicating that all of the plurality of PUCCH power control parameter sets configured to the WD are one of activated and deactivated. In some embodiments, the MAC CE is a variable size and the MAC CE comprises a field indicating whether an octet comprising the n-bit field, S, is present in the MAC CE. In some embodiments, the MAC CE comprises a field, F, indicating whether one of i) all of the plurality of PUCCH power control parameter sets configured to the WD are activated or deactivated; and ii) only one of the sets is activated for all PUCCH resources indicated in the MAC CE.

In some embodiments, the MAC CE comprises a field, S, a meaning of a first value comprised in the field, S, being based on a second value comprised in the field, F. In some embodiments, the field, S, one of activates and deactivates all of the plurality of PUCCH power control parameter sets, when the second value comprised in the field, F, is one of a '1' and a '0'; and the field, S, one of activates and deactivates only one PUCCH power control parameter set, when the second value comprised in the field, F, is another one of the '1' and a '0'. In some embodiments, when the second value comprised in the field, F, is one of a '1' and a '0', the field, S, is ignored and all of the plurality of PUCCH power control parameter sets are activated; and when the second value comprised in the field, F, is another one of the '1' and a '0', only one PUCCH power control parameter set is activated/deactivated and the field, S, indicates which one PUCCH power control parameter set out of the plurality of PUCCH power control parameter sets is activated/deactivated.

In some embodiments, the MAC CE comprises a spatial relation information ID field in an octet, the spatial relation information ID field identifying the spatial relation activated for the one of the PUCCH resource and the PUCCH resource group that is identified in a PUCCH resource index field in a previous octet. In some embodiments, the MAC CE comprises: a field, E, in a first octet indicating whether a PUCCH resource is being updated by a spatial relation or a power control set; a PUCCH resource index field in a second octet identifying the one of the PUCCH resource and the PUCCH resource group associated with the MAC CE; and a third octet subsequent to the second octet, the third octet comprising a spatial relation information identifier (ID) field and a field, S, the spatial relation information ID identifying a spatial relation and the field, S, identifying a PUCCH power control parameter set. In some embodiments, based on a value comprised in the field, E, one of the spatial relation and the field, S, is activated for the one of the PUCCH resource and the PUCCH resource group identified by the PUCCH resource index field in the second octet.

In some embodiments, the at least two PUCCH power control parameter sets are explicitly configured and/or wherein each set comprises a set index value identifying the respective PUCCH power control parameter set. In some embodiments, the at least two PUCCH power control parameter sets are implicitly configured and/or wherein at least two PUCCH spatial relations are configured to the WD, each PUCCH spatial relation comprising a PUCCH pathloss reference identifier (ID), a P0-PUCCH ID and a closed-loop index corresponding to a respective one of the at least two sets of PUCCH power control parameters. In some embodiments, the at least two PUCCH power control parameter sets are configured to the WD only when at least two sounding reference signal resource (SRS) sets have a parameter usage set to "codebook" or "noncodebook" for the WD in an uplink (UL) bandwidth part (BWP) of a carrier frequency supported by a primary cell (Pcell).

In some embodiments, the MAC CE comprises at least one of: a 2-bit bandwidth part (BWP) field, a 5-bit serving cell identifier (ID) field and a first reserved bit in a first octet; a 7-bit PUCCH resource index field and a second reserved bit in a second octet; and a dedicated 1-bit field for each of the two sets of PUCCH power control parameters in a third octet. In other embodiments, different bit size fields are possible.

In some embodiments, each set is activated for the one of the PUCCH resource and the PUCCH resource group when a corresponding dedicated 1-bit field is set to one of '1' and '0' and deactivated when the corresponding dedicated 1-bit field is set to another one of '1' and '0'. In some embodiments, conditioned on a value comprised in the first or second reserved bit, the third octet and/or the dedicated 1-bit fields are ignored/not present in the MAC CE. In some embodiments, the MAC CE comprises at least one of: a 2-bit bandwidth part (BWP) field, a 5-bit serving cell identifier (ID) field and a first set indicator in a first octet; and a 7-bit PUCCH resource index field and a second set indicator in a second octet. In other embodiments, different bit size fields are possible.

In some embodiments, when first set indicator is set to one of '1' and '0', all of the plurality of PUCCH power control parameter sets are activated and the second set indicator is ignored; and when the first set indicator is set to another one of '1' and '0', the second set indicator indicates the PUCCH power control parameter set out of the plurality of PUCCH power control parameter sets that is activated. In some embodiments, when all of the plurality of PUCCH power control parameter sets configured to the WD are activated by the MAC CE, the PUCCH transmissions from the WD are received at different times per PUCCH power control parameter set.

In some embodiments, the method further includes configuring, such as via configuration unit 32, processing circuitry 68, processor 70, communication interface 60 and/or radio interface 62, the WD 22 with the one of the PUCCH resource and the PUCCH resource group; and each PUCCH power control parameter set comprises power control parameters for the WD to transmit signaling toward a corresponding transmit receive point (TRP) associated with the network node 16.

FIG. 11 is a flowchart of an example process in a wireless device 22 according to some embodiments of the present disclosure. One or more Blocks and/or functions and/or methods performed by WD 22 may be performed by one or more elements of WD 22 such as by power control unit 34 in processing circuitry 84, processor 86, radio interface 82, etc. Wireless device 22 such as via processing circuitry 84 and/or processor 86 and/or radio interface 82 is configured to perform at least one of the steps in Blocks S138 and S140. The example method includes receiving (Block S138), such as via power control unit 34, processing circuitry 84, processor 86 and/or radio interface 82, a medium access control, MAC, control element, CE, the MAC CE indicating an association between i) one of a physical uplink control channel, PUCCH, resource and a PUCCH resource group; and ii) at least one first PUCCH power control parameter set out of a plurality of PUCCH power control parameter sets. The method further includes optionally, transmitting (Block S140), such as via power control unit 34, processing circuitry 84, processor 86 and/or radio interface 82, a PUCCH transmission on the one of the PUCCH resource and the PUCCH resource group, the PUCCH transmission comprising a transmit power level based on the at least one first PUCCH power control parameter set that is associated to the one of the PUCCH resource and the PUCCH resource group.

In some embodiments, the method further includes receiving, such as via power control unit 34, processing circuitry 84, processor 86 and/or radio interface 82, a configuration comprising at least two PUCCH power control parameter sets. In some embodiments, the MAC CE comprises a n-bit field, S, each bit in the n-bit field, S, corresponding to a respective PUCCH power control parameter set and wherein each PUCCH power control parameter set is one of activated and deactivated based on a value in the corresponding bit. In some embodiments, n is 2. In some embodiments, the MAC CE comprises a 1-bit activation/deactivation field indicating that all of the plurality of PUCCH power control parameter sets configured to the WD are one of activated and deactivated.

In some embodiments, the MAC CE is a variable size and the MAC CE comprises a field indicating whether an octet comprising the n-bit field, S, is present in the MAC CE. In some embodiments, the MAC CE comprises a field, F, indicating whether one of i) all of the plurality of PUCCH power control parameter sets configured to the WD are activated or deactivated; and ii) only one of the sets is activated for all PUCCH resources indicated in the MAC CE. In some embodiments, the MAC CE comprises a field, S, a meaning of a first value comprised in the field, S, being based on a second value comprised in the field, F. In some embodiments, the field, S, one of activates and deactivates all of the plurality of PUCCH power control parameter sets, when the second value comprised in the field, F, is one of a '1' and a '0'; and the field, S, one of activates and deactivates only one PUCCH power control parameter set, when the second value comprised in the field, F, is another one of the '1' and a '0'.

In some embodiments, when the second value comprised in the field, F, is one of a '1' and a '0', the field, S, is ignored and all of the plurality of PUCCH power control parameter sets are activated; and when the second value comprised in the field, F, is another one of the '1' and a '0', only one PUCCH power control parameter set is activated/deactivated and the field, S, indicates which one PUCCH power control parameter set out of the plurality of PUCCH power control parameter sets is activated/deactivated.

In some embodiments, the MAC CE comprises a spatial relation information ID field in an octet, the spatial relation information ID field identifying the spatial relation activated for the one of the PUCCH resource and the PUCCH resource group that is identified in a PUCCH resource index field in a previous octet. In some embodiments, the MAC CE comprises: a field, E, in a first octet indicating whether a PUCCH resource is being updated by a spatial relation or a power control set; a PUCCH resource index field in a second octet identifying the one of the PUCCH resource and the PUCCH resource group associated with the MAC CE; a third octet subsequent to the second octet, the third octet comprising a spatial relation information identifier (ID) field and a field, S, the spatial relation information ID identifying a spatial relation and the field, S, identifying a PUCCH power control parameter set; and wherein based on a value comprised in the field, E, one of the spatial relation and the field, S, is activated for the one of the PUCCH resource and the PUCCH resource group that is identified by the PUCCH resource index field in the second octet.

In some embodiments, the at least two PUCCH power control parameter sets are explicitly configured and/or wherein each set comprises a set index value identifying the respective PUCCH power control parameter set. In some embodiments, the at least two PUCCH power control parameter sets are implicitly configured and/or wherein at least two PUCCH spatial relations are configured to the WD, each PUCCH spatial relation comprising a PUCCH pathloss reference identifier (ID), a P0-PUCCH ID and a closed-loop index corresponding to a respective one of the at least two sets of PUCCH power control parameters.

In some embodiments, the at least two PUCCH power control parameter sets are configured to the WD 22 only when at least two sounding reference signal resource (SRS) sets have a parameter usage set to “codebook” or “noncodebook” for the WD in an uplink (UL) bandwidth part (BWP) of a carrier frequency supported by a primary cell (Pcell). In some embodiments, the MAC CE comprises: a 2-bit bandwidth part (BWP) field, a 5-bit serving cell identifier (ID) field and a first reserved bit in a first octet; a 7-bit PUCCH resource index field and a second reserved bit in a second octet; and a dedicated 1-bit field for each of the two sets of PUCCH power control parameters in a third octet.

In some embodiments, each set is activated for the one of the PUCCH resource and the PUCCH resource group when a corresponding dedicated 1-bit field is set to one of ‘1’ and ‘0’ and deactivated when the corresponding dedicated 1-bit field is set to another one of ‘1’ and ‘0’. In some embodiments, conditioned on a value comprised in the first or second reserved bit, the third octet and/or the dedicated 1-bit fields are ignored/not present in the MAC CE. In some embodiments, the MAC CE comprises: a 2-bit bandwidth part (BWP) field, a 5-bit serving cell identifier (ID) field and a first set indicator in a first octet; and a 7-bit PUCCH resource index field and a second set indicator in a second octet.

In some embodiments, when first set indicator is set to one of ‘1’ and ‘0’, all of the plurality of PUCCH power control parameter sets are activated and the second set indicator is ignored; and when the first set indicator is set to another one of ‘1’ and ‘0’, the second set indicator indicates the PUCCH power control parameter set out of the plurality of PUCCH power control parameter sets that is activated. In some embodiments, when all of the plurality of PUCCH power control parameter sets configured to the WD are activated by the MAC CE, the method comprises transmitting, such as via power control unit 34, processing circuitry 84, processor 86 and/or radio interface 82, each of the corresponding PUCCH transmissions at different times per PUCCH power control parameter set.

In some embodiments, the method further includes receiving, such as via power control unit 34, processing circuitry 84, processor 86 and/or radio interface 82, a configuration comprising the one of the PUCCH resource and the PUCCH resource group; and each PUCCH power control parameter set comprises power control parameters for the WD to transmit signaling toward a corresponding transmit receive point (TRP) associated with the network node.

FIG. 12 is a flowchart of an example process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. Network node 16 such as via processing circuitry 68 and/or processor 70 and/or radio interface 62 and/or communication interface 60 is configured to configure the WD with a list of at least two power control parameter sets for power control of a physical uplink control channel, PUCCH, applicable to at least one of at least one PUCCH resource and at least one group of PUCCH resources (Block S142). The process also includes transmitting a medium access control, MAC, control element, CE, to the WD (22) to activate at least one power control parameter set from the list of power control parameter sets applicable to at least one of (1) one PUCCH resource, (2) each one of multiple PUCCH resources, and (3) multiple groups of PUCCH resources (Block S144).

In some embodiments, each of the list of at least two power control parameter set includes a PUCCH pathloss reference signal identifier, ID, a target receive power, P0-PUCCH, ID, a closed-loop index, and a power control parameter set ID. In some embodiments, the method also includes configuring the WD (22) with PUCCH repetition to at least one transmission and reception point, TRP, each TRP associated with at least one of the at least two power control parameter sets. In some embodiments, the MAC CE includes a PUCCH resource identifier including two bit fields, each bit field identifying a respective PUCCH power control parameter set from the list of at least two control parameter sets. In some embodiments, the MAC CE comprises a bit field that indicates whether one of two PUCCH power control sets and a single PUCCH power control set is activated for the at least one of (1) one PUCCH resource, (2) each one of the multiple PUCCH resources, and (3) the multiple groups of PUCCH resources. In some embodiments, the MAC CE includes: a spatial relation information ID field in an octet, the spatial relation information ID field identifying the spatial relation activated for the one of a PUCCH resource from the multiple PUCCH resources and a group of PUCCH resources from the multiple groups of PUCCH resources that is identified in a PUCCH resource index field in a previous octet. In some embodiments, the MAC CE includes: a field, E, in a first octet indicating whether a PUCCH resource is being updated by a spatial relation or a power control set; a PUCCH resource index field in a second octet identifying the one of a PUCCH resource from the multiple PUCCH resources and a group of PUCCH resources from the multiple groups of PUCCH resources; and a third octet subsequent to the second octet, the third octet comprising a spatial relation information identifier, ID, field identifying a spatial relation and an S field identifying a PUCCH power control parameter set; and wherein, based at least in part on a value comprised in the field, E, one of the spatial relation and the S field is activated for the one of the PUCCH resource and the group of PUCCH resources identified by the PUCCH resource index field in the second octet. In some embodiments, at least two PUCCH spatial relations are configured to the WD (22), each PUCCH spatial relation comprising a PUCCH pathloss reference identifier, ID, a P0-PUCCH ID and a closed-loop index. In some embodiments, the MAC CE includes: a bandwidth part, BWP, field, a serving cell identifier, ID, field in a first octet; a field indicating whether one of one set and two sets of PUCCH power control parameters are activated; a 7-bit PUCCH resource index field in a second octet; and a dedicated field for each of the two sets of PUCCH power control parameters in a third octet. In some embodiments, each PUCCH power control parameter set comprises power control parameters for the WD (22) to calculate PUCCH transmit power toward a corresponding transmit receive point, TRP, associated with the network node (16).

FIG. 13 is a flowchart of an example process in a wireless device 22 according to some embodiments of the present disclosure. One or more Blocks and/or functions and/or methods performed by WD 22 may be performed by one or more elements of WD 22 such as by power control unit 34 in processing circuitry 84, processor 86, radio interface 82, etc. Wireless device 22 such as via processing circuitry 84 and/or processor 86 and/or radio interface 82 is configured to receive a configuration of a list of at least two power control parameter sets for power control of a physical uplink control channel, PUCCH, applicable to at least one of at least one PUCCH resource and at least one group of PUCCH resources (Block S146). The process also includes setting a transmit power level based at least in part on at least one of the at least two power control parameter sets in the list (Block S148).

In some embodiments, each of the list of at least two power control parameter set comprises a PUCCH pathloss reference signal identifier, ID, a target receive power, P0-PUCCH, ID, a closed-loop index, and a power control parameter set ID. In some embodiments, the method also includes configuring the WD (22) with PUCCH repetition to at least one transmission and reception point, TRP, each TRP associated with at least one of the at least two power control parameter sets. In some embodiments, the MAC CE includes a PUCCH resource identifier including two bit fields, each bit field identifying a respective PUCCH power control parameter set from the list of at least two control parameter sets. In some embodiments, the MAC CE comprises a bit field that indicates whether one of two PUCCH power control sets and a single PUCCH power control set is activated for the at least one of (1) one PUCCH resource, (2) each one of the multiple PUCCH resources, and (3) the multiple groups of PUCCH resources. In some embodiments, the MAC CE includes: a spatial relation information ID field in an octet, the spatial relation information ID field identifying the spatial relation activated for the one of a PUCCH resource from the multiple PUCCH resources and a group of PUCCH resources from the multiple groups of PUCCH resources that is identified in a PUCCH resource index field in a previous octet. In some embodiments, the MAC CE includes: a field, E, in a first octet indicating whether a PUCCH resource is being updated by a spatial relation or a power control set; a PUCCH resource index field in a second octet identifying the one of a PUCCH resource from the multiple PUCCH resources and a group of PUCCH resources from the multiple groups of PUCCH resources; and a third octet subsequent to the second octet, the third octet comprising a spatial relation information identifier, ID, field identifying a spatial relation and an S field identifying a PUCCH power control parameter set; and wherein, based at least in part on a value comprised in the field, E, one of the spatial relation and the S field is activated for the one of the PUCCH resource and the group of PUCCH resources identified by the PUCCH resource index field in the second octet. In some embodiments, the MAC CE is further configured to configure at least two PUCCH spatial relations, each PUCCH spatial relation comprising a PUCCH pathloss reference identifier, ID, a P0-PUCCH ID and a closed-loop index. In some embodiments, the MAC CE includes: a bandwidth part, BWP, field, a serving cell identifier, ID, field in a first octet; a field indicating whether one of one set and two sets of PUCCH power control parameters are activated; a 7-bit PUCCH resource index field in a second octet; and a dedicated field for each of the two sets of PUCCH power control parameters in a third octet. In some embodiments, each PUCCH power control parameter set comprises power control parameters for the WD (22) to calculate PUCCH transmit power toward a corresponding transmit receive point, TRP, associated with the network node (16).

Having described the general process flow of arrangements of the disclosure and having provided examples of hardware and software arrangements for implementing the processes and functions of the disclosure, the sections below provide details and examples of arrangements for PUCCH power control towards multiple TRPs, which may be implemented by the network node 16, wireless device 22 and/or host computer 24.

The examples below are described with respect to one or more TRPs, which may be network nodes 16; although for ease of understanding the term "TRP 16" is used instead.

Figure 14:
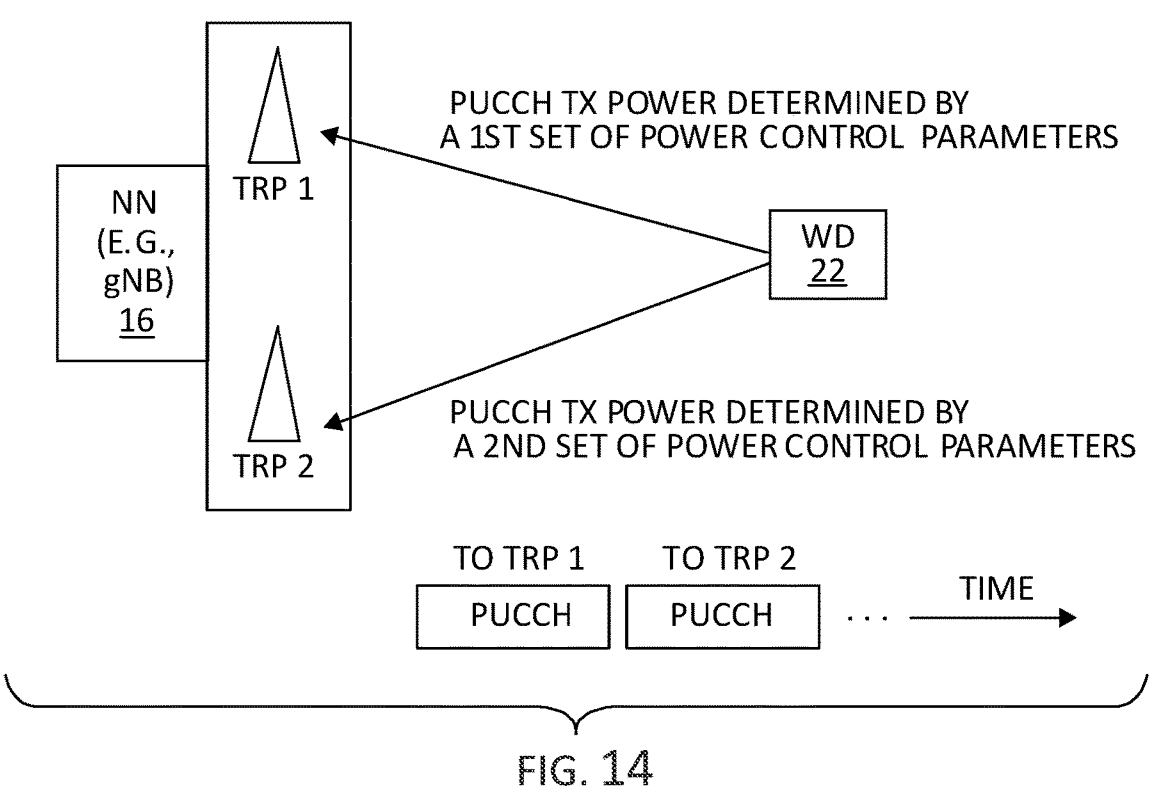
FIG. 14 illustrates an example of PUCCH repetition towards multiple TRPs according to some embodiments of the present disclosure.

FIG. 14 illustrates an example of PUCCH repetition towards multiple TRPs 16. For PUCCH repetition intended for reception at two different TRPs 16, PUCCH power control is done separately for each intended receiving TRP 16.

Two sets, a first and second sets, of PUCCH power control parameters may be configured to a WD 22, intended for each TRP 16 respectively. Each of the two sets of power control parameters comprises at least a PUCCH pathloss reference signal index, a WD 22 specific P0 value or a P0-PUCCH index, and a closed loop index. The WD 22 may also be configured with one or more PUCCH resources.

Explicit Configuration of Two PUCCH Power Control Parameter Sets

Figure 15:
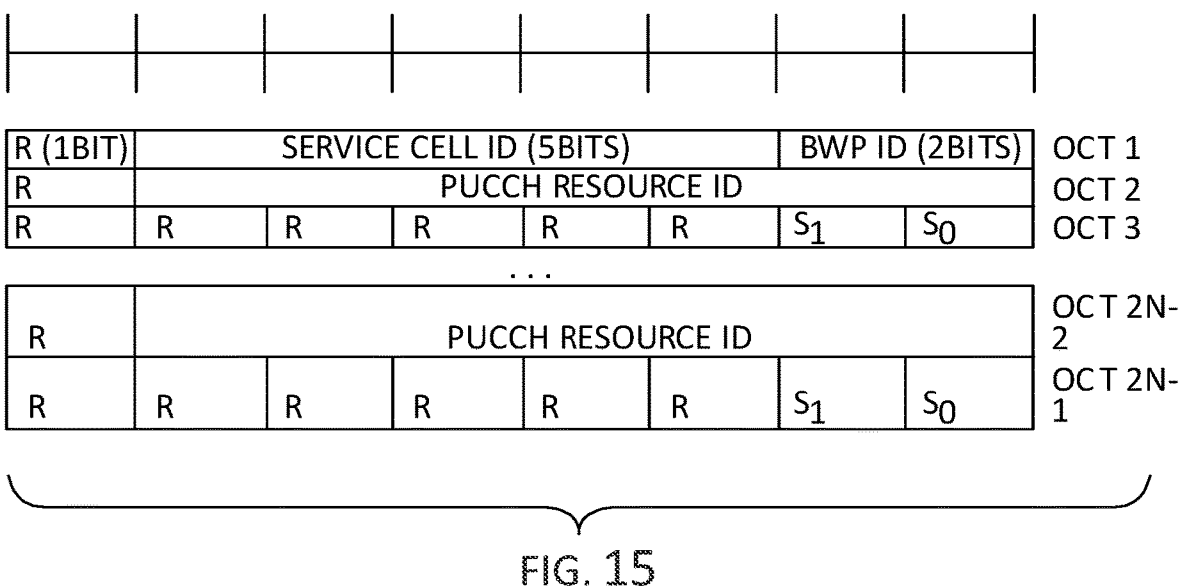
FIG. 15 illustrates an example of MAC CE for activating/updating PUCCH power control parameter set(s) according to some embodiments of the present disclosure.

In one embodiment, a PUCCH spatial relation may not be configured for a WD 22. The two sets of PUCCH power control parameters are explicitly configured. An example is shown in FIG. 15, where each set is identified by a set index. The corresponding changes in PUCCH-PowerControl IE is shown herein below, where the changes are highlighted below:

First set with set ID_1
  PUCCH pathloss reference RS ID_1.
  P0-PUCCH ID_1
  Closed loop ID_1
Second set with set ID_2
  PUCCH pathloss reference RS ID_2
  P0-PUCCH ID_2
  Closed loop ID_2

An example of configuring two sets of power control parameters.

PUCCH-PowerControl information element

```
-- ASN1START
-- TAG-PUCCH-POWERCONTROL-START
PUCCH-PowerControl ::=          SEQUENCE {
  deltaF-PUCCH-f0              INTEGER (−16..15)   OPTIONAL, -- Need R
  deltaF-PUCCH-f1              INTEGER (−16..15)   OPTIONAL, -- Need R
  deltaF-PUCCH-f2              INTEGER (−16..15)   OPTIONAL, -- Need R
  deltaF-PUCCH-f3              INTEGER (−16..15)   OPTIONAL, -- Need R
  deltaF-PUCCH-f4              INTEGER (−16..15)   OPTIONAL, -- Need R
  p0-Set             SEQUENCE (SIZE (1..maxNrofPUCCH-P0-PerSet)) OF
P0-PUCCH
                   OPTIONAL, -- Need M
  pathlossReferenceRSs             SEQUENCE (SIZE (1..maxNrofPUCCH-
PathlossReferenceRSs)) OF PUCCH-PathlossReferenceRS
                                              OPTIONAL, -- Need M
  twoPUCCH-PC-AdjustmentStates            ENUMERATED {twoStates}
OPTIONAL, -- Need S
  ...,
  [[
  pathlossReferenceRSs-v1610           SetupRelease { PathlossReferenceRSs-v1610 }
OPTIONAL -- Need M
]],
[[
pucch-PowerControlSets-r17            SEQUENCE (SIZE (2)) OF Pucch-
PowerControlParaSet-r17
]]
}
P0-PUCCH ::=                   SEQUENCE {
  p0-PUCCH-Id                    ,
  p0-PUCCH-Value                   INTEGER (−16..15)
}
P0-PUCCH-Id ::=                 INTEGER (1..8)
PathlossReferenceRSs-v1610 ::=          SEQUENCE (SIZE (1..maxNrofPUCCH-
PathlossReferenceRSsDiff-r16)) OF PUCCH-PathlossReferenceRS-r16
PUCCH-PathlossReferenceRS ::=               SEQUENCE {
  pucch-PathlossReferenceRS-Id                  ,
  referenceSignal                 CHOICE {
    ssb-Index                     SSB-Index,
    csi-RS-Index                      NZP-CSI-RS-ResourceId
  }
}
PUCCH-PathlossReferenceRS-r16 ::=              SEQUENCE {
  pucch-PathlossReferenceRS-Id-r16              PUCCH-PathlossReferenceRS-Id-
v1610,
  referenceSignal-r16                    CHOICE {
    ssb-Index-r16                        SSB-Index,
    csi-RS-Index-r16                      NZP-CSI-RS-ResourceId
  }
}
Pucch-PowerControlParaSet-r17                SEQUENCE{
pucch-PowerControlParaSet-Id                   PUCCH-PowerControlParaSet-Id
pucch-PathlossReferenceRS-Id                   PUCCH-PathlossReferenceRS-Id
p0-PUCCH-Id
closedLoopIndex                 ENUMERATED {i0, i1 }
}
PUCCH-PowerControlParaSet-Id ::=           INTEGER (0,1)
-- TAG-PUCCH-POWERCONTROL-STOP
-- ASN1STOP
```

Each PUCCH resource (or group of PUCCH resources) is activated/updated with a MAC CE with one or both of the first and second sets of PUCCH power control parameters by referring to the set index (i.e., PUCCH-PowerControlPara-Set-Id). An example of the MAC CE for activating/updating one or both of the first and second sets of PUCCH power control parameters is shown in FIG. 15. It has a variable size including one or more of the following fields:

Serving Cell ID: This field indicates the identity of the Serving Cell for which the MAC CE applies;

BWP ID: This field indicates a UL BWP for which the MAC CE applies;

PUCCH Resource ID: This field contains an identifier of the PUCCH resource ID identified by PUCCH-ResourceId as specified in 3GPP TS 38.331. If the indicated PUCCH Resource is configured as part of a PUCCH Group as specified in 3GPP TS 38.331, no other PUCCH Resources within the same PUCCH group are indicated in the MAC CE, and this MAC CE applies to all the PUCCH Resources in the PUCCH group;

$S_i$: $S_i$ indicates the activation status of PUCCH power control parameter set i. The $S_i$ field is set to 1 to indicate PUCCH power control parameter set with PUCCH-PowerControlParaSet-Id equal to i will be activated. The $S_i$ field is set to 0 to indicate PUCCH power control parameter set with PUCCH-PowerControlParaSet-Id equal to i will be deactivated; and R: Reserved bit, set to 0.

FIG. 15 illustrates an example of MAC CE for activating/updating PUCCH power control parameter set(s).

Figure 16:
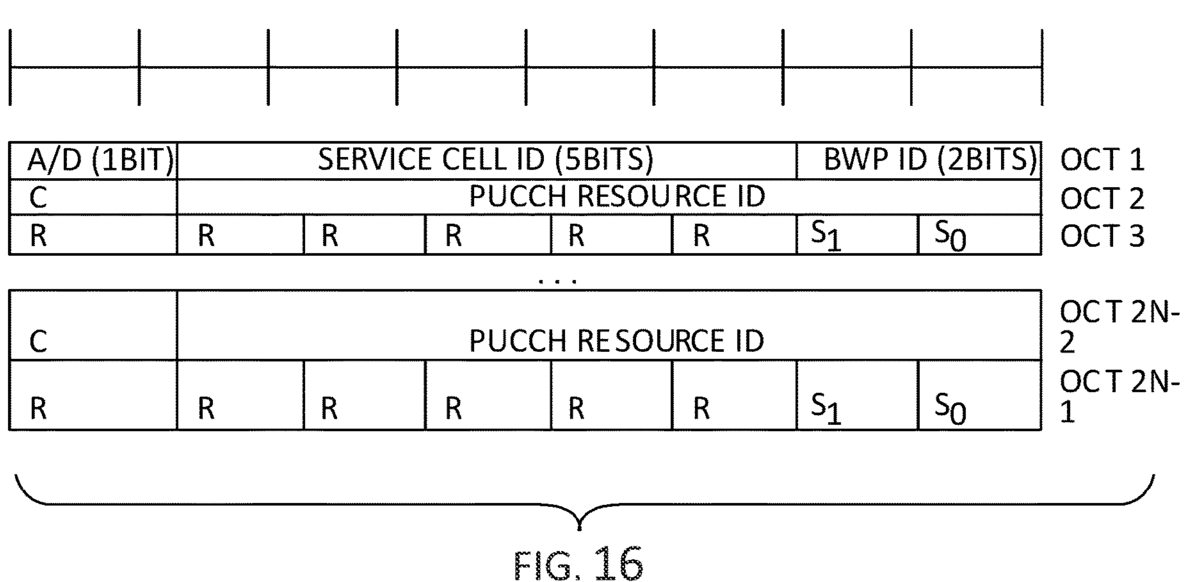
FIG. 16 illustrates an example of MAC CE for activating/updating PUCCH power control parameter set(s) according to some embodiments of the present disclosure.

Another example of the MAC CE for activating/updating one or both of the first and second sets of PUCCH power control parameters is shown in FIG. 14. The MAC CE of FIG. 16 has a variable size including one or more of the following fields:

Serving Cell ID: This field indicates the identity of the Serving Cell for which the MAC CE applies;

BWP ID: This field indicates a UL BWP for which the MAC CE applies.

A/D: This field indicates whether both PUCCH-PowerControlParaSet-Id are activated or deactivated if field C is set to 0. Otherwise this field is omitted by the WD;

PUCCH Resource ID: This field contains an identifier of the PUCCH resource ID identified by PUCCH-ResourceId as specified in 3GPP TS 38.331. If the indicated PUCCH Resource is configured as part of a PUCCH Group as specified in 3GPP TS 38.331, no other PUCCH Resources within the same PUCCH group are indicated in the MAC CE, and this MAC CE applies to all the PUCCH Resources in the PUCCH group;

$S_i$: $S_i$ indicates the activation status of PUCCH power control parameter set i. The $S_i$ field is set to 1 to indicate PUCCH power control parameter set with PUCCH-PowerControlParaSet-Id equal to i will be activated. The $S_i$ field is set to 0 to indicate PUCCH power control parameter set with PUCCH-PowerControlParaSet-Id equal to i will be deactivated;

C: indicates whether the octet containing Si fields is present. If C is set to 1, the octet containing Si fields is present and if C is set to 0 the octet is not present and both PUCCH-PowerControlParaSet-Id are activated or deactivated depending on how A/D field is set; and R: Reserved bit, set to 0.

A benefit of this MAC CE variant is that it saves octets that are needed for the MAC CE in case both PUCCH-PowerControlParaSet-Id are activated or deactivated. This MAC CE can also be defined without A/D field such that C field with value 0 always activates both PUCCH-PowerControlParaSet-Id.

Figure 17:
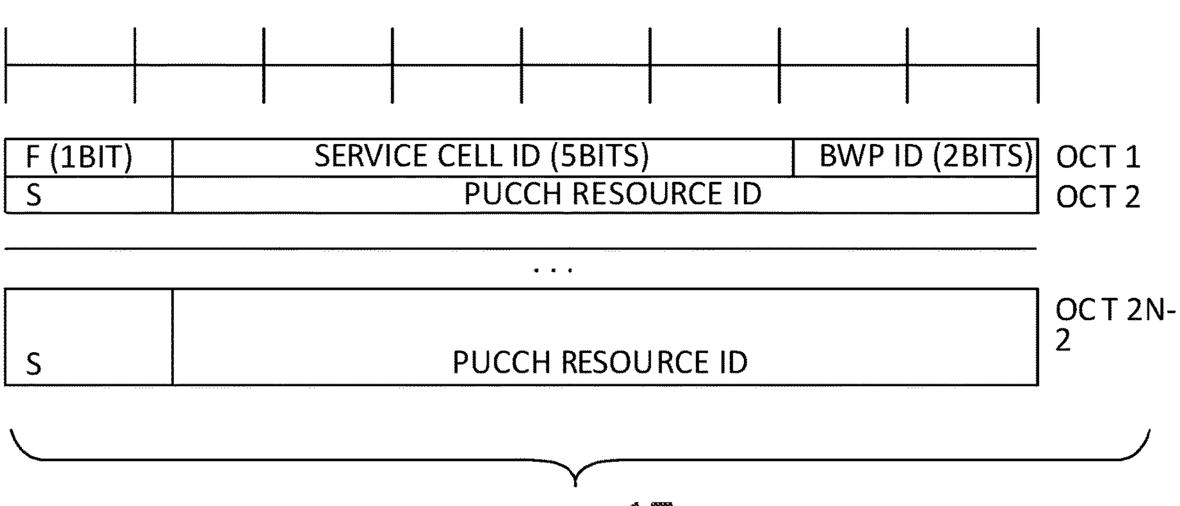
FIG. 17 illustrates an example of MAC CE for activating/updating PUCCH power control parameter set(s) according to some embodiments of the present disclosure.

Yet another example of the MAC CE for activating/updating one or both of the first and second sets of PUCCH power control parameters is shown in FIG. 17. It has a variable size including one or more of the following fields:

Serving Cell ID: This field indicates the identity of the Serving Cell for which the MAC CE applies;

BWP ID: This field indicates a UL BWP for which the MAC CE applies;

F: This field indicates whether both PUCCH-PowerControlParaSet-Id are activated or deactivated or if only one of PUCCH-PowerControlParaSet-Id is activated for all PUCCH resources indicated in this MAC CE. If F field has value 1 both PUCCH-PowerControlParaSet-Id are activated or deactivated depending on how S field is set. If F field is set to "0", one PUCCH-PowerControlParaSet-Id are activated and the other PUCCH-PowerControlParaSet-Id is deactivated as indicated by field S. Alternatively, if F field has value 1 both PUCCH-PowerControlParaSet-Id are activated and S field is ignored. If F field is set to "0", one PUCCH-PowerControlParaSet-Id are activated and the other PUCCH-PowerControlParaSet-Id is deactivated as indicated by field S;

PUCCH Resource ID: This field contains an identifier of the PUCCH resource ID identified by PUCCH-ResourceId as specified in 3GPP TS 38.331. If the indicated PUCCH Resource is configured as part of a PUCCH Group as specified in 3GPP TS 38.331, no other PUCCH Resources within the same PUCCH group are indicated in the MAC CE, and this MAC CE applies to all the PUCCH Resources in the PUCCH group; and S: If F field is set to "1", the S field indicates the activation status of both PUCCH power control parameter sets. The S field is set to 1 to activate both PUCCH power control parameter sets. The $S_i$ field is set to 0 to deactivate both PUCCH power control parameter set. Alternatively, Alternatively, if F field has value 1 both PUCCH-PowerControlParaSet-Id are activated and S field is ignored. If F field is set to "0", the S field indicates activation status of PUCCH power control parameter set i. The S field set to "1" to indicate PUCCH power control parameter set with PUCCH-PowerControlParaSet-Id equal to 1 will be activated and with PUCCH-PowerControlParaSet-Id equal to 0 deactivated. The S field set to "0" to indicate PUCCH power control parameter set with PUCCH-PowerControlParaSet-Id equal to 0 will be activated and with PUCCH-PowerControlParaSet-Id equal to 1 deactivated.

A benefit of this MAC CE variant is that it saves octets that are needed for the MAC CE. The network would send one MAC CE for all PUCCH resources that will activate/deactivate both PUCCH power control parameter sets and another MAC CE for all PUCCH resources that will activate/dectactive one of the PUCCH power control parameter sets. As the number of configured PUCCH resources per BWP per cell can be 128, the overhead saving is considerable.

Figures 18, 19:
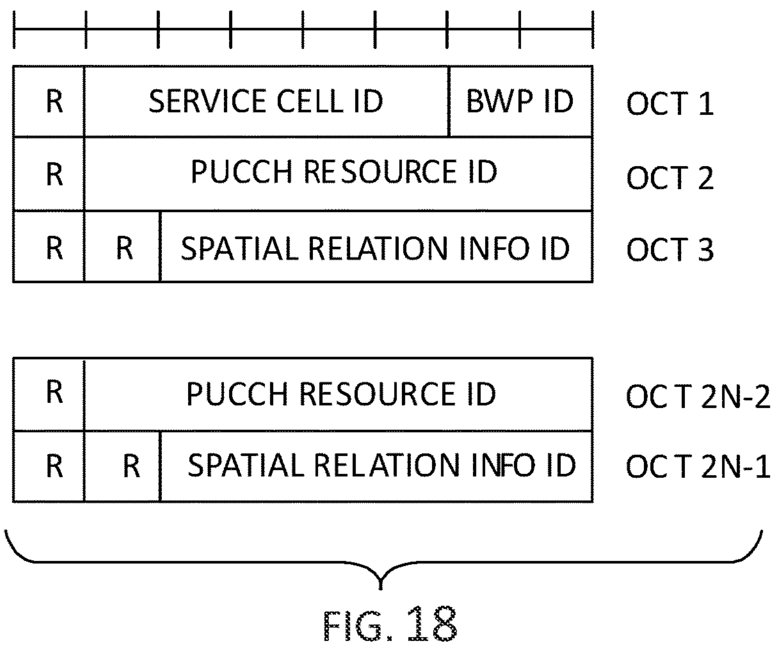
FIG. 18 illustrates an example of MAC CE for updating PUCCH spatial relation according to some embodiments of the present disclosure.
FIG. 19 illustrates an example of modified MAC CE to activate/update either Spatial Relation or power control set(s) according to some embodiments of the present disclosure.

The 3GPP NR Rel-16 MAC CE in FIG. 18 shows a MAC CE for updating PUCCH spatial relation (reproduced from Figure 6.1.3.25-1 of 3GPP TS 38.321 V16.3.0).

In the existing MAC CE of FIG. 18, spatial relation of the PUCCH resource with resource identifier 'PUCCH Resource ID' is updated/activated with the spatial relation with identifier 'Spatial Relation Info ID' in the subsequent octet.

In another embodiment, the above MAC CE is modified as shown in FIG. 19. FIG. 19 illustrates an example modified MAC CE to activate/update either Spatial Relation or power control set(s). In this modified MAC CE, the 'E' field in the first octet indicates whether a PUCCH resource is being updated with a spatial relation or power control set(s). The fields 'S1' and 'S0' indicate respectively whether the first power control set and/or the second power control set should be activated/updated for the PUCCH resource given by the PUCCH resource ID in the previous octet. If both 'S1' and 'S0' are set to 1, then both power control sets are activated for the PUCCH resource by the PUCCH resource ID in the previous octet, conditioned on the value of 'E' field. If 'S1' is set to 0 and 'S0' are set to 1, then only the 1st power control set is activated for the PUCCH resource by the PUCCH resource ID in the previous octet, conditioned on the value of 'E' field. If 'S1' is set to 0 and 'S0' are set to 1, then only the 1st power control set is activated for the PUCCH resource by the PUCCH resource ID in the previous octet, conditioned on the value of 'E' field. If 'S1' is set to 1 and 'S0' are set to 0, then only the 2nd power control set is activated for the PUCCH resource by the PUCCH resource ID in the previous octet, conditioned on the value of 'E' field.

If the 'E' field is set to 0, then the PUCCH resource with resource ID 'PUCCH resource ID' is activated with the spatial relation with identifier 'Spatial Relation Info ID' in the next octet.

If the 'E' field is set to 1, then the PUCCH resource with resource ID 'PUCCH resource ID' is activated with the power control set(s) given by 'S1' and 'S0' in the next octet.

In another embodiment, a single MAC CE that is different from the MAC CE of FIG. 19 is used to update one or more PUCCH resource(s) with one of the following:

one or two power control set(s); or one or two spatial relation(s).

A field in this single MAC CE can indicate whether the one or more PUCCH resource(s) are being updated with the power control set(s) or spatial relation(s).

When both of the two sets are activated for a PUCCH resource, the PUCCH would be repeated to a first and second TRPs 16. The first set of power control parameters are applied for PUCCH transmission occasions to the first TRP 16 and the second set of power control parameters are applied for PUCCH transmission occasions to the second TRP 16. When the first (or second) set is activated for a PUCCH resource, the PUCCH would be transmitted to a TRP 16 by applying the first (or second) set of power control parameters.

In another embodiment, the activation/update of power control set(s) of a PUCCH resource can be extended to a group of PUCCH resources. The following example assumes a case where a PUCCH resource is configured as part of a PUCCH group as specified in 3GPP Technical Standard (TS) 38.331. Then, when the power control set(s) are activated/updated to this PUCCH resource according to the proposed MAC CEs described above, then this activated/updated power control set(s) apply to all the PUCCH resources in the PUCCH group. In this embodiment, only a single PUCCH resource from a PUCCH group may be allowed in a MAC CE that updates the power control set(s). A benefit of this embodiment may include that multiple MAC CE's do not need to be sent to update the power control set(s) of PUCCH resources in a PUCCH resource group. Hence, control signaling overhead is conserved.

Note that the term TRP 16 may not be used in 3GPP specifications. Instead, TRP 16 may be represented by a 'power control parameter set' in 3GPP specifications. For instance, the first and second configured power control parameter sets may respectively represent the first and second TRPs 16.

Implicit Configuration of Two PUCCH Power Control Parameter Sets

In one embodiment, it may be assumed that a WD 22 is configured with PUCCH spatial relations and the two sets of power control parameters are implicitly configured. For example, the two sets of parameters are configured together as two or more PUCCH pathloss reference signals, two or more WD 22 specific P0 values, and two closed loops as shown in FIG. 18. This can be done with the existing PUCCH-PowerControl IE. The lists below show an example of configuring two sets of power control parameters.

List of PUCCH pathloss reference RS:
  PUCCH pathloss reference RS ID_1;
  PUCCH pathloss reference RS ID_2;
List of P0-PUCCH:
  P0-PUCCH ID_1;
  P0-PUCCH ID_2;
List of closed loop indices:
  Closed loop ID_1;
  Closed loop ID_2.

Bold=first set.
Italics=second set.

Each PUCCH spatial relation contains a PUCCH pathloss reference ID, a P0-PUCCH ID, and a closed-loop index of one of the two sets of PUCCH power control parameters. When two PUCCH spatial relations are activated for a PUCCH resource, the PUCCH would be repeated to a first and second TRPs 16. The power control parameters indicated in a first and second spatial relations are applied for PUCCH transmission occasions to the first and second TRPs 16, respectively.

In one embodiment, the two sets of PUCCH power control parameters may be configured only when two SRS resource sets have the usage parameter set to "Codebook" or "nonCodebook" are configured for a WD 22 in an UL BWP of carrier frequency of a primary cell.

Figure 20:
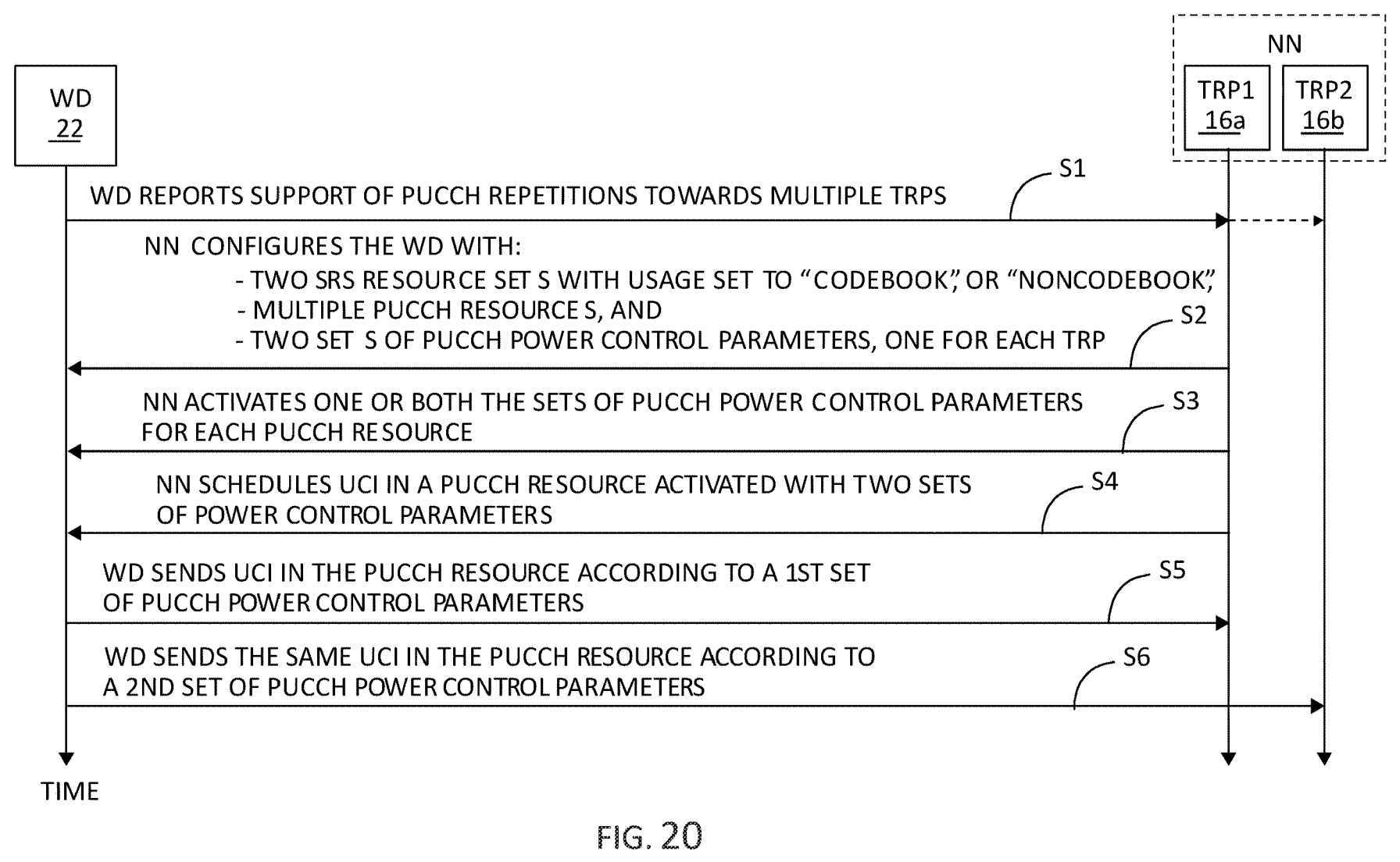

FIG. 20 illustrates an example call flow diagram illustrating example signaling between a WD 22 and a network node 16 associated with a TRP1 16*a* and TRP2 16*b*. This embodiment is illustrated for 2 TRPs; however, it may also be applicable to a scenario with more than 2 TRPs, in which case n sets are configured, where n can be any number.

In step S1, the WD 22 reports support of PUCCH repetitions towards multiple TRPs 16*a*, 16*b*. In step S2, a network node, such as one or more of the TRPs 16*a*, 16*b* may configure the WD 22 with one or more of: two SRS resource sets with usage set to "codebook", or "nonCodebook"; multiple PUCCH resources; and two sets of PUCCH power control parameters, one for each TRP. In step S3, the network node, such as via TRP 16*a*, activates one or both the sets of PUCCH power control parameters for each PUCCH resource. In step S4, the network node, such as via TRP 16*a*, schedules UCI in a PUCCH resource activated with the two sets of power control parameters. In step S5, WD 22 sends UCI in the PUCCH resource according to a $1^{st}$ set of PUCCH power control parameters toward TRP1 16*a*. In step S6, WD 22 sends the same UCI in the PUCCH resource (e.g., the same PUCCH resource used in step S5), but according to a $2^{nd}$ set of PUCCH power control parameters toward TRP2 16*b*.

Some embodiments may include one or more of the following:

Embodiment A1. A network node configured to communicate with a wireless device (WD), the network node configured to, and/or comprising a radio interface and/or comprising processing circuitry configured to one or more of:

send a medium access control, MAC, control element, CE, to the WD, the MAC CE indicating an association between i) one of a physical uplink control channel, PUCCH, resource and a PUCCH resource group; and ii) at least one first PUCCH power control parameter set out of a plurality of PUCCH power control parameter sets; and optionally, receive a PUCCH transmission from the WD on the one of the PUCCH resource and the PUCCH resource group, the PUCCH transmission comprising a transmit power level based on the at least one first PUCCH power control parameter set that is associated to the one of the PUCCH resource and the PUCCH resource group.

Embodiment A2. The network node of Embodiment A1, wherein the network node and/or the radio interface and/or the processing circuitry is configured to:

configure the WD with at least two PUCCH power control parameter sets.

Embodiment A3. The network node of any one of Embodiments A1 and A2, wherein the MAC CE comprises a n-bit field, S, each bit in the n-bit field, S, corresponding to a respective PUCCH power control parameter set and wherein each PUCCH power control parameter set is one of activated and deactivated based on a value in the corresponding bit.

Embodiment A4. The network node of Embodiment A3, wherein n is 2.

Embodiment A5. The network node of any one of Embodiments A3 and A4, wherein the MAC CE comprises a 1-bit activation/deactivation field indicating that all of the plurality of PUCCH power control parameter sets configured to the WD are one of activated and deactivated.

Embodiment A6. The network node of any one of Embodiments A3-A5, wherein the MAC CE is a variable size and the MAC CE comprises a field indicating whether an octet comprising the n-bit field, S, is present in the MAC CE.

Embodiment A7. The network node of Embodiment A1, wherein the MAC CE comprises a field, F, indicating whether one of i) all of the plurality of PUCCH power control parameter sets configured to the WD are activated or deactivated; and ii) only one of the sets is activated for all PUCCH resources indicated in the MAC CE.

Embodiment A8. The network node of Embodiment A7, wherein the MAC CE comprises a field, S, a meaning of a first value comprised in the field, S, being based on a second value comprised in the field, F.

Embodiment A9. The network node of Embodiment A8, wherein the field, S, one of activates and deactivates all of the plurality of PUCCH power control parameter sets, when the second value comprised in the field, F, is one of a '1' and a '0'; and wherein the field, S, one of activates and deactivates only one PUCCH power control parameter set, when the second value comprised in the field, F, is another one of the '1' and a '0'.

Embodiment A10. The network node of Embodiment A8, wherein when the second value comprised in the field, F, is one of a '1' and a '0', the field, S, is ignored and all of the plurality of PUCCH power control parameter sets are activated; and wherein when the second value comprised in the field, F, is another one of the '1' and a '0', only one PUCCH power control parameter set is activated/deactivated and the field, S, indicates which one PUCCH power control parameter set out of the plurality of PUCCH power control parameter sets is activated/deactivated.

Embodiment A11. The network node of Embodiment A1, wherein the MAC CE comprises:

a spatial relation information ID field in an octet, the spatial relation information ID field identifying the spatial relation activated for the one of the PUCCH resource and the PUCCH resource group that is identified in a PUCCH resource index field in a previous octet.

Embodiment A12. The network node of Embodiment A1, wherein the MAC CE comprises:

a field, E, in a first octet indicating whether a PUCCH resource is being updated by a spatial relation or a power control set;

a PUCCH resource index field in a second octet identifying the one of the PUCCH resource and the PUCCH resource group associated with the MAC CE; and a third octet subsequent to the second octet, the third octet comprising a spatial relation information identifier (ID) field and a field, S, the spatial relation information ID identifying a spatial relation and the field, S, identifying a PUCCH power control parameter set; and wherein based on a value comprised in the field, E, one of the spatial relation and the field, S, is activated for the one of the PUCCH resource and the PUCCH resource group identified by the PUCCH resource index field in the second octet.

Embodiment A13. The network node of any one of Embodiments A1-A12, wherein the at least two PUCCH power control parameter sets are explicitly configured and/or wherein each set comprises a set index value identifying the respective PUCCH power control parameter set.

Embodiment A14. The network node of any one of Embodiments A1-A13, wherein the at least two PUCCH power control parameter sets are implicitly configured and/or wherein at least two PUCCH spatial relations are configured to the WD, each PUCCH spatial relation comprising a PUCCH pathloss reference identifier (ID), a P0-PUCCH ID and a closed-loop index corresponding to a respective one of the at least two sets of PUCCH power control parameters.

Embodiment A15. The network node of any one of Embodiments A1-A14, wherein the at least two PUCCH power control parameter sets are configured to the WD only when at least two sounding reference signal resource (SRS) sets have a parameter usage set to "codebook" or "noncodebook" for the WD in an uplink (UL) bandwidth part (BWP) of a carrier frequency supported by a primary cell (Pcell).

Embodiment A16. The network node of any one of Embodiments A1, A2 and A13-A15, wherein the MAC CE comprises:

a 2-bit bandwidth part (BWP) field, a 5-bit serving cell identifier (ID) field and a first reserved bit in a first octet; and a 7-bit PUCCH resource index field and a second reserved bit in a second octet; and a dedicated 1-bit field for each of the two sets of PUCCH power control parameters in a third octet.

Embodiment A17. The network node of Embodiment A16, wherein each set is activated for the one of the PUCCH resource and the PUCCH resource group when a corresponding dedicated 1-bit field is set to one of '1' and '0' and deactivated when the corresponding dedicated 1-bit field is set to another one of '1' and '0'.

Embodiment A18. The network node of any one of Embodiments A16 and A17, wherein conditioned on a value comprised in the first or second reserved bit, the third octet and/or the dedicated 1-bit fields are ignored/not present in the MAC CE.

Embodiment A19. The network node of any one of Embodiments A1, A2 and A13-A15, wherein the MAC CE comprises:

a 2-bit bandwidth part (BWP) field, a 5-bit serving cell identifier (ID) field and a first set indicator in a first octet; and a 7-bit PUCCH resource index field and a second set indicator in a second octet.

Embodiment A20. The network node of Embodiment A19, wherein when first set indicator is set to one of '1' and '0', all of the plurality of PUCCH power control parameter sets are activated and the second set indicator is ignored; and wherein when the first set indicator is set to another one of '1' and '0', the second set indicator indicates the PUCCH power control parameter set out of the plurality of PUCCH power control parameter sets that is activated.

Embodiment A21. The network node of any one of Embodiments A1-A20, when all of the plurality of PUCCH power control parameter sets configured to the WD are activated by the MAC CE, the PUCCH transmissions from the WD are received at different times per PUCCH power control parameter set.

Embodiment A22. The network node of any one of Embodiments A1-A21, wherein the network node and/or the radio interface and/or the processing circuitry is configured to:

configure the WD with the one of the PUCCH resource and the PUCCH resource group; and wherein each PUCCH power control parameter set comprises power control parameters for the WD to transmit signaling toward a corresponding transmit receive point (TRP) associated with the network node.

Embodiment B1. A method implemented in a network node, the method comprising:

sending a medium access control, MAC, control element, CE, to the WD, the MAC CE indicating an association between i) one of a physical uplink control channel, PUCCH, resource and a PUCCH resource group; and ii) at least one first PUCCH power control parameter set out of a plurality of PUCCH power control parameter sets; and optionally, receiving a PUCCH transmission from the WD on the one of the PUCCH resource and the PUCCH resource group, the PUCCH transmission comprising a transmit power level based on the at least one first PUCCH power control parameter set that is associated to the one of the PUCCH resource and the PUCCH resource group.

Embodiment B2. The method of Embodiment B1, further comprising:

configuring the WD with at least two PUCCH power control parameter sets.

Embodiment B3. The method of any one of Embodiments B1 and B2, wherein the MAC CE comprises a n-bit field, S, each bit in the n-bit field, S, corresponding to a respective PUCCH power control parameter set and wherein each PUCCH power control parameter set is one of activated and deactivated based on a value in the corresponding bit.

Embodiment B4. The method of Embodiment B3, wherein n is 2.

Embodiment B5. The method of any one of Embodiments B3 and B4, wherein the MAC CE comprises a 1-bit activation/deactivation field indicating that all of the plurality of PUCCH power control parameter sets configured to the WD are one of activated and deactivated.

Embodiment B6. The method of any one of Embodiments B3-B5, wherein the MAC CE is a variable size and the MAC CE comprises a field indicating whether an octet comprising the n-bit field, S, is present in the MAC CE.

Embodiment B7. The method of Embodiment B1, wherein the MAC CE comprises a field, F, indicating whether one of i) all of the plurality of PUCCH power control parameter sets configured to the WD are activated or deactivated; and ii) only one of the sets is activated for all PUCCH resources indicated in the MAC CE.

Embodiment B8. The method of Embodiment B7, wherein the MAC CE comprises a field, S, a meaning of a first value comprised in the field, S, being based on a second value comprised in the field, F.

Embodiment B9. The method of Embodiment B8, wherein the field, S, one of activates and deactivates all of the plurality of PUCCH power control parameter sets, when the second value comprised in the field, F, is one of a ‘1’ and a ‘0’; and wherein the field, S, one of activates and deactivates only one PUCCH power control parameter set, when the second value comprised in the field, F, is another one of the ‘1’ and a ‘0’.

Embodiment B10. The method of Embodiment B8, wherein when the second value comprised in the field, F, is one of a ‘1’ and a ‘0’, the field, S, is ignored and all of the plurality of PUCCH power control parameter sets are activated; and wherein when the second value comprised in the field, F, is another one of the ‘1’ and a ‘0’, only one PUCCH power control parameter set is activated/deactivated and the field, S, indicates which one PUCCH power control parameter set out of the plurality of PUCCH power control parameter sets is activated/deactivated.

Embodiment B11. The method of Embodiment B1, wherein the MAC CE comprises a spatial relation information ID field in an octet, the spatial relation information ID field identifying the spatial relation activated for the one of the PUCCH resource and the PUCCH resource group that is identified in a PUCCH resource index field in a previous octet.

Embodiment B12. The method of Embodiment B1, wherein the MAC CE comprises:

a field, E, in a first octet indicating whether a PUCCH resource is being updated by a spatial relation or a power control set;

a PUCCH resource index field in a second octet identifying the one of the PUCCH resource and the PUCCH resource group associated with the MAC CE; and a third octet subsequent to the second octet, the third octet comprising a spatial relation information identifier (ID) field and a field, S, the spatial relation information ID identifying a spatial relation and the field, S, identifying a PUCCH power control parameter set; and wherein based on a value comprised in the field, E, one of the spatial relation and the field, S, is activated for the one of the PUCCH resource and the PUCCH resource group identified by the PUCCH resource index field in the second octet.

Embodiment B13. The method of any one of Embodiments B1-B12, wherein the at least two PUCCH power control parameter sets are explicitly configured and/or wherein each set comprises a set index value identifying the respective PUCCH power control parameter set.

Embodiment B14. The method of any one of Embodiments B1-B13, wherein the at least two PUCCH power control parameter sets are implicitly configured and/or wherein at least two PUCCH spatial relations are configured to the WD, each PUCCH spatial relation comprising a PUCCH pathloss reference identifier (ID), a P0-PUCCH ID and a closed-loop index corresponding to a respective one of the at least two sets of PUCCH power control parameters.

Embodiment B15. The method of any one of Embodiments B1-B14, wherein the at least two PUCCH power control parameter sets are configured to the WD only when at least two sounding reference signal resource (SRS) sets have a parameter usage set to “codebook” or “noncodebook” for the WD in an uplink (UL) bandwidth part (BWP) of a carrier frequency supported by a primary cell (Pcell).

Embodiment B16. The method of any one of Embodiments B1, B2 and B13-B15, wherein the MAC CE comprises:

a 2-bit bandwidth part (BWP) field, a 5-bit serving cell identifier (ID) field and a first reserved bit in a first octet; and a 7-bit PUCCH resource index field and a second reserved bit in a second octet; and a dedicated 1-bit field for each of the two sets of PUCCH power control parameters in a third octet.

Embodiment B17. The method of Embodiment B16, wherein each set is activated for the one of the PUCCH resource and the PUCCH resource group when a corresponding dedicated 1-bit field is set to one of '1' and '0' and deactivated when the corresponding dedicated 1-bit field is set to another one of '1' and '0'.

Embodiment B18. The method of any one of Embodiments B16 and B17, wherein conditioned on a value comprised in the first or second reserved bit, the third octet and/or the dedicated 1-bit fields are ignored/not present in the MAC CE.

Embodiment B19. The method of any one of Embodiments B1, B2 and B13-B15, wherein the MAC CE comprises:

a 2-bit bandwidth part (BWP) field, a 5-bit serving cell identifier (ID) field and a first set indicator in a first octet; and a 7-bit PUCCH resource index field and a second set indicator in a second octet.

Embodiment B20. The method of Embodiment B19, wherein when first set indicator is set to one of '1' and '0', all of the plurality of PUCCH power control parameter sets are activated and the second set indicator is ignored; and wherein when the first set indicator is set to another one of '1' and '0', the second set indicator indicates the PUCCH power control parameter set out of the plurality of PUCCH power control parameter sets that is activated.

Embodiment B21. The method of any one of Embodiments B1-B20, when all of the plurality of PUCCH power control parameter sets configured to the WD are activated by the MAC CE, the PUCCH transmissions from the WD are received at different times per PUCCH power control parameter set.

Embodiment B22. The method of any one of Embodiments B1-B21, further comprising:

configuring the WD with the one of the PUCCH resource and the PUCCH resource group; and wherein each PUCCH power control parameter set comprises power control parameters for the WD to transmit signaling toward a corresponding transmit receive point (TRP) associated with the network node.

Embodiment C1. A wireless device (WD) configured to communicate with a network node, the WD configured to, and/or comprising a radio interface and/or processing circuitry configured to:

receive a medium access control, MAC, control element, CE, the MAC CE indicating an association between i) one of a physical uplink control channel, PUCCH, resource and a PUCCH resource group; and ii) at least one first PUCCH power control parameter set out of a plurality of PUCCH power control parameter sets; and optionally, transmit a PUCCH transmission on the one of the PUCCH resource and the PUCCH resource group, the PUCCH transmission comprising a transmit power level based on the at least one first PUCCH power control parameter set that is associated to the one of the PUCCH resource and the PUCCH resource group.

Embodiment C2. The WD of Embodiment C1, wherein the WD and/or the radio interface and/or the processing circuitry is configured to:

receive a configuration comprising at least two PUCCH power control parameter sets.

Embodiment C3. The WD of any one of Embodiments C1 and C2, wherein the MAC CE comprises a n-bit field, S, each bit in the n-bit field, S, corresponding to a respective PUCCH power control parameter set and wherein each PUCCH power control parameter set is one of activated and deactivated based on a value in the corresponding bit.

Embodiment C4. The WD of Embodiment C3, wherein n is 2.

Embodiment C5. The WD of any one of Embodiments C3 and C4, wherein the MAC CE comprises a 1-bit activation/deactivation field indicating that all of the plurality of PUCCH power control parameter sets configured to the WD are one of activated and deactivated.

Embodiment C6. The WD of any one of Embodiments C3-C5, wherein the MAC CE is a variable size and the MAC CE comprises a field indicating whether an octet comprising the n-bit field, S, is present in the MAC CE.

Embodiment C7. The WD of Embodiment C1, wherein the MAC CE comprises a field, F, indicating whether one of i) all of the plurality of PUCCH power control parameter sets configured to the WD are activated or deactivated; and ii) only one of the sets is activated for all PUCCH resources indicated in the MAC CE.

Embodiment C8. The WD of Embodiment C7, wherein the MAC CE comprises a field, S, a meaning of a first value comprised in the field, S, being based on a second value comprised in the field, F.

Embodiment C9. The WD of Embodiment C8, wherein the field, S, one of activates and deactivates all of the plurality of PUCCH power control parameter sets, when the second value comprised in the field, F, is one of a '1' and a '0'; and wherein the field, S, one of activates and deactivates only one PUCCH power control parameter set, when the second value comprised in the field, F, is another one of the '1' and a '0'.

Embodiment C10. The WD of Embodiment C8, wherein when the second value comprised in the field, F, is one of a '1' and a '0', the field, S, is ignored and all of the plurality of PUCCH power control parameter sets are activated; and wherein when the second value comprised in the field, F, is another one of the '1' and a '0', only one PUCCH power control parameter set is activated/deactivated and the field, S, indicates which one PUCCH power control parameter set out of the plurality of PUCCH power control parameter sets is activated/deactivated.

Embodiment C11. The WD of Embodiment C1, wherein the MAC CE comprises a spatial relation information ID field in an octet, the spatial relation information ID field identifying the spatial relation activated for the one of the PUCCH resource and the PUCCH resource group that is identified in a PUCCH resource index field in a previous octet.

Embodiment C12. The WD of Embodiment C1, wherein the MAC CE comprises:

a field, E, in a first octet indicating whether a PUCCH resource is being updated by a spatial relation or a power control set;

a PUCCH resource index field in a second octet identifying the one of the PUCCH resource and the PUCCH resource group associated with the MAC CE;

a third octet subsequent to the second octet, the third octet comprising a spatial relation information identifier (ID) field and a field, S, the spatial relation information ID identifying a spatial relation and the field, S, identifying a PUCCH power control parameter set; and wherein based on a value comprised in the field, E, one of the spatial relation and the field, S, is activated for the one of the PUCCH resource and the PUCCH resource group that is identified by the PUCCH resource index field in the second octet.

Embodiment C13. The WD of any one of Embodiments C1-C12, wherein the at least two PUCCH power control parameter sets are explicitly configured and/or wherein each set comprises a set index value identifying the respective PUCCH power control parameter set.

Embodiment C14. The WD of any one of Embodiments C1-C13, wherein the at least two PUCCH power control parameter sets are implicitly configured and/or wherein at least two PUCCH spatial relations are configured to the WD, each PUCCH spatial relation comprising a PUCCH pathloss reference identifier (ID), a P0-PUCCH ID and a closed-loop index corresponding to a respective one of the at least two sets of PUCCH power control parameters.

Embodiment C15. The WD of any one of Embodiments C1-C14, wherein the at least two PUCCH power control parameter sets are configured to the WD only when at least two sounding reference signal resource (SRS) sets have a parameter usage set to "codebook" or "noncodebook" for the WD in an uplink (UL) bandwidth part (BWP) of a carrier frequency supported by a primary cell (Pcell).

Embodiment C16. The WD of any one of Embodiments C1, C2 and C13-C15, wherein the MAC CE comprises:

a 2-bit bandwidth part (BWP) field, a 5-bit serving cell identifier (ID) field and a first reserved bit in a first octet;

a 7-bit PUCCH resource index field and a second reserved bit in a second octet; and a dedicated 1-bit field for each of the two sets of PUCCH power control parameters in a third octet.

Embodiment C17. The WD of Embodiment C16, wherein each set is activated for the one of the PUCCH resource and the PUCCH resource group when a corresponding dedicated 1-bit field is set to one of '1' and '0' and deactivated when the corresponding dedicated 1-bit field is set to another one of '1' and '0'.

Embodiment C18. The WD of any one of Embodiments C16 and C17, wherein conditioned on a value comprised in the first or second reserved bit, the third octet and/or the dedicated 1-bit fields are ignored/not present in the MAC CE.

Embodiment C19. The WD of any one of Embodiments C1, C2 and C13-C15, wherein the MAC CE comprises:

a 2-bit bandwidth part (BWP) field, a 5-bit serving cell identifier (ID) field and a first set indicator in a first octet; and a 7-bit PUCCH resource index field and a second set indicator in a second octet.

Embodiment C20. The WD of Embodiment C19, wherein when first set indicator is set to one of '1' and '0', all of the plurality of PUCCH power control parameter sets are activated and the second set indicator is ignored; and wherein when the first set indicator is set to another one of '1' and '0', the second set indicator indicates the PUCCH power control parameter set out of the plurality of PUCCH power control parameter sets that is activated.

Embodiment C21. The WD of any one of Embodiments C1-C20, wherein when all of the plurality of PUCCH power control parameter sets configured to the WD are activated by the MAC CE, the WD and/or the radio interface and/or the processing circuitry is configured to transmit the each of the corresponding PUCCH transmissions at different times per PUCCH power control parameter set.

Embodiment C22. The WD of any one of Embodiments C1-C21, wherein the WD and/or the radio interface and/or the processing circuitry is configured to:

receive a configuration comprising the one of the PUCCH resource and the PUCCH resource group; and wherein each PUCCH power control parameter set comprises power control parameters for the WD to transmit signaling toward a corresponding transmit receive point (TRP) associated with the network node.

Embodiment D1. A method implemented in a wireless device (WD), the method comprising:

receiving a medium access control, MAC, control element, CE, the MAC CE indicating an association between i) one of a physical uplink control channel, PUCCH, resource and a PUCCH resource group; and ii) at least one first PUCCH power control parameter set out of a plurality of PUCCH power control parameter sets; and optionally, transmitting a PUCCH transmission on the one of the PUCCH resource and the PUCCH resource group, the PUCCH transmission comprising a transmit power level based on the at least one first PUCCH power control parameter set that is associated to the one of the PUCCH resource and the PUCCH resource group.

Embodiment D2. The method of Embodiment D1, further comprising:

receiving a configuration comprising at least two PUCCH power control parameter sets.

Embodiment D3. The method of any one of Embodiments D1 and D2, wherein the MAC CE comprises a n-bit field, S, each bit in the n-bit field, S, corresponding to a respective PUCCH power control parameter set and wherein each PUCCH power control parameter set is one of activated and deactivated based on a value in the corresponding bit.

Embodiment D4. The method of Embodiment D3, wherein n is 2.

Embodiment D5. The method of any one of Embodiments D3 and D4, wherein the MAC CE comprises a 1-bit activation/deactivation field indicating that all of the plurality of PUCCH power control parameter sets configured to the WD are one of activated and deactivated.

Embodiment D6. The method of any one of Embodiments D3-D5, wherein the MAC CE is a variable size and the MAC CE comprises a field indicating whether an octet comprising the n-bit field, S, is present in the MAC CE.

Embodiment D7. The method of Embodiment D1, wherein the MAC CE comprises a field, F, indicating whether one of i) all of the plurality of PUCCH power control parameter sets configured to the WD are activated or deactivated; and ii) only one of the sets is activated for all PUCCH resources indicated in the MAC CE.

Embodiment D8. The method of Embodiment D7, wherein the MAC CE comprises a field, S, a meaning of a first value comprised in the field, S, being based on a second value comprised in the field, F.

Embodiment D9. The method of Embodiment D8, wherein the field, S, one of activates and deactivates all of the plurality of PUCCH power control parameter sets, when the second value comprised in the field, F, is one of a ‘1’ and a ‘0’; and wherein the field, S, one of activates and deactivates only one PUCCH power control parameter set, when the second value comprised in the field, F, is another one of the ‘1’ and a ‘0’.

Embodiment D10. The method of Embodiment D8, wherein when the second value comprised in the field, F, is one of a ‘1’ and a ‘0’, the field, S, is ignored and all of the plurality of PUCCH power control parameter sets are activated; and wherein when the second value comprised in the field, F, is another one of the ‘1’ and a ‘0’, only one PUCCH power control parameter set is activated/deactivated and the field, S, indicates which one PUCCH power control parameter set out of the plurality of PUCCH power control parameter sets is activated/deactivated.

Embodiment D11. The method of Embodiment D1, wherein the MAC CE comprises a spatial relation information ID field in an octet, the spatial relation information ID field identifying the spatial relation activated for the one of the PUCCH resource and the PUCCH resource group that is identified in a PUCCH resource index field in a previous octet.

Embodiment D12. The method of Embodiment D1, wherein the MAC CE comprises:

a field, E, in a first octet indicating whether a PUCCH resource is being updated by a spatial relation or a power control set;

a PUCCH resource index field in a second octet identifying the one of the PUCCH resource and the PUCCH resource group associated with the MAC CE;

a third octet subsequent to the second octet, the third octet comprising a spatial relation information identifier (ID) field and a field, S, the spatial relation information ID identifying a spatial relation and the field, S, identifying a PUCCH power control parameter set; and wherein based on a value comprised in the field, E, one of the spatial relation and the field, S, is activated for the one of the PUCCH resource and the PUCCH resource group that is identified by the PUCCH resource index field in the second octet.

Embodiment D13. The method of any one of Embodiments D1-D12, wherein the at least two PUCCH power control parameter sets are explicitly configured and/or wherein each set comprises a set index value identifying the respective PUCCH power control parameter set.

Embodiment D14. The method of any one of Embodiments D1-D13, wherein the at least two PUCCH power control parameter sets are implicitly configured and/or wherein at least two PUCCH spatial relations are configured to the WD, each PUCCH spatial relation comprising a PUCCH pathloss reference identifier (ID), a P0-PUCCH ID and a closed-loop index corresponding to a respective one of the at least two sets of PUCCH power control parameters.

Embodiment D15. The method of any one of Embodiments D1-D14, wherein the at least two PUCCH power control parameter sets are configured to the WD only when at least two sounding reference signal resource (SRS) sets have a parameter usage set to “codebook” or “noncodebook” for the WD in an uplink (UL) bandwidth part (BWP) of a carrier frequency supported by a primary cell (Pcell).

Embodiment D16. The method of any one of Embodiments D1, D2 and D13-D15, wherein the MAC CE comprises:

a 2-bit bandwidth part (BWP) field, a 5-bit serving cell identifier (ID) field and a first reserved bit in a first octet;

a 7-bit PUCCH resource index field and a second reserved bit in a second octet; and a dedicated 1-bit field for each of the two sets of PUCCH power control parameters in a third octet.

Embodiment D17. The method of Embodiment D16, wherein each set is activated for the one of the PUCCH resource and the PUCCH resource group when a corresponding dedicated 1-bit field is set to one of ‘1’ and ‘0’ and deactivated when the corresponding dedicated 1-bit field is set to another one of ‘1’ and ‘0’.

Embodiment D18. The method of any one of Embodiments D16 and D17, wherein conditioned on a value comprised in the first or second reserved bit, the third octet and/or the dedicated 1-bit fields are ignored/not present in the MAC CE.

Embodiment D19. The method of any one of Embodiments D1, D2 and D13-D15, wherein the MAC CE comprises:

a 2-bit bandwidth part (BWP) field, a 5-bit serving cell identifier (ID) field and a first set indicator in a first octet; and a 7-bit PUCCH resource index field and a second set indicator in a second octet.

Embodiment D20. The method of Embodiment D19, wherein when first set indicator is set to one of ‘1’ and ‘0’, all of the plurality of PUCCH power control parameter sets are activated and the second set indicator is ignored; and wherein when the first set indicator is set to another one of ‘1’ and ‘0’, the second set indicator indicates the PUCCH power control parameter set out of the plurality of PUCCH power control parameter sets that is activated.

Embodiment D21. The method of any one of Embodiments D1-D20, wherein when all of the plurality of PUCCH power control parameter sets configured to the WD are activated by the MAC CE, the method comprises transmitting each of the corresponding PUCCH transmissions at different times per PUCCH power control parameter set.

Embodiment D22. The method of any one of Embodiments D1-D21, further comprising:

receiving a configuration comprising the one of the PUCCH resource and the PUCCH resource group; and wherein each PUCCH power control parameter set comprises power control parameters for the WD to transmit signaling toward a corresponding transmit receive point (TRP) associated with the network node.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a “circuit” or “module.” Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, WD, the network node comprising:
- processing circuitry configured to configure the WD with a list of at least two power control parameter sets for power control of a physical uplink control channel, PUCCH, applicable to at least one of at least one PUCCH resource and at least one group of PUCCH resources; and
- a radio interface in communication with the processing circuitry and configured to transmit a medium access control, MAC, control element, CE, to the WD to activate at least one power control parameter set from the list of power control parameter sets applicable to at least one of (1) one PUCCH resource, (2) each one of multiple PUCCH resources, and (3) multiple groups of PUCCH resources, the MAC CE including:
  - a bandwidth part, BWP, field, a serving cell identifier, ID, field in a first octet;
  - a field indicating whether one of one set and two sets of PUCCH power control parameters are activated;
  - a 7-bit PUCCH resource index field in a second octet; and
  - a dedicated field for each of the two sets of PUCCH power control parameters in a third octet.

2. A method implemented in a network node configured to communicate with a wireless device, WD, the method comprising:
- configuring the WD with a list of at least two power control parameter sets for power control of a physical uplink control channel, PUCCH, applicable to at least one of at least one PUCCH resource and at least one group of PUCCH resources; and
- transmitting a medium access control, MAC, control element, CE, to the WD to activate at least one power control parameter set from the list of power control parameter sets applicable to at least one of (1) one PUCCH resource, (2) each one of multiple PUCCH resources, and (3) multiple groups of PUCCH resources, the MAC CE including:
  - a bandwidth part, BWP, field, a serving cell identifier, ID, field in a first octet;
  - a field indicating whether one of one set and two sets of PUCCH power control parameters are activated;
  - a 7-bit PUCCH resource index field in a second octet; and
  - a dedicated field for each of the two sets of PUCCH power control parameters in a third octet.

3. The method of claim 2, wherein each of the list of at least two power control parameter set includes a PUCCH pathloss reference signal identifier, ID, a target receive power, P0-PUCCH, ID, a closed-loop index, and a power control parameter set ID.

4. The method of claim 2, further comprising configuring the WD with PUCCH repetition to at least one transmission and reception point, TRP, each TRP associated with at least one of the at least two power control parameter sets.

5. The method of claim 2, wherein the MAC CE includes a PUCCH resource identifier including two bit fields, each bit field identifying a respective PUCCH power control parameter set from the list of at least two control parameter sets.

6. The method of claim 2, wherein the MAC CE comprises a bit field that indicates whether one of two PUCCH power control parameter sets and a single PUCCH power control set is activated for the at least one of (1) one PUCCH resource, (2) each one of the multiple PUCCH resources, and (3) the multiple groups of PUCCH resources.

7. A wireless device, WD, configured to communicate with a network node, the WD comprising:

a radio interface configured to receive a medium access control, MAC, control element, CE, from the network node to activate at least one power control parameter set from a list of at least two power control parameter sets for power control of a physical uplink control channel, PUCCH, applicable to at least one of at least one PUCCH resource and at least one group of PUCCH resources; and processing circuitry in communication with the radio interface and configured to set a transmit power level based at least in part on at least one of the at least two power control parameter sets in the list, the MAC CE including:

a bandwidth part, BWP, field, a serving cell identifier, ID, field in a first octet;

a field indicating whether one of one set and two sets of PUCCH power control parameters are activated;

a 7-bit PUCCH resource index field in a second octet; and a dedicated field for each of the two sets of PUCCH power control parameters in a third octet.

8. The WD of claim 7, wherein each of the list of at least two power control parameter set comprises a PUCCH pathloss reference signal identifier, ID, a target receive power, P0-PUCCH, ID, a closed-loop index, and a power control parameter set ID.

9. The WD of claim 7, wherein the processing circuitry is further configured to configure the WD with PUCCH repetition to at least one transmission and reception point, TRP, each TRP associated with at least one of the at least two power control parameter sets.

10. The WD of claim 7, wherein the MAC CE includes a PUCCH resource identifier including two bit fields, each bit field identifying a respective PUCCH power control parameter set from the list of at least two control parameter sets.

11. The WD of claim 7, wherein the MAC CE comprises a bit field that indicates whether one of two PUCCH power control parameter sets and a single PUCCH power control set is activated for the at least one of at least one PUCCH resource and at least one group of PUCCH resources.

12. A method implemented in a wireless device, WD, configured to communicate with a network node, the method comprising:

receiving a medium access control, MAC, control element, CE, from the network node to activate at least one power control parameter set from of a list of at least two power control parameter sets for power control of a physical uplink control channel, PUCCH, applicable to at least one of at least one PUCCH resource and at least one group of PUCCH resources; and setting a transmit power level based at least in part on at least one of the at least two power control parameter sets in the list, the MAC CE including:

a bandwidth part, BWP, field, a serving cell identifier, ID, field in a first octet;

a field indicating whether one of one set and two sets of PUCCH power control parameters are activated;

a 7-bit PUCCH resource index field in a second octet; and a dedicated field for each of the two sets of PUCCH power control parameters in a third octet.

13. The method of claim 12, wherein each of the list of at least two power control parameter set comprises a PUCCH pathloss reference signal identifier, ID, a target receive power, P0-PUCCH, ID, a closed-loop index, and a power control parameter set ID.

14. The method of claim 12, further comprising configuring the WD with PUCCH repetition to at least one transmission and reception point, TRP, each TRP associated with at least one of the at least two power control parameter sets.

15. The method of claim 12, wherein the MAC CE includes a PUCCH resource identifier including two bit fields, each bit field identifying a respective PUCCH power control parameter set from the list of at least two control parameter sets.

16. The method of claim 12, wherein the MAC CE comprises a bit field that indicates whether one of two PUCCH power control parameter sets and a single PUCCH power control set is activated for the at least one of at least one PUCCH resource and at least one group of PUCCH resources.

* * * * *